US011259194B2

(12) United States Patent
Hwang et al.

(10) Patent No.: US 11,259,194 B2
(45) Date of Patent: Feb. 22, 2022

(54) RADIO LINK FAILURE PROCESSING METHOD AND APPARATUS THEREFOR

(71) Applicant: Samsung Electronics Co., Ltd., Suwon-si (KR)

(72) Inventors: June Hwang, Incheon (KR); Hyun-Jeong Kang, Seoul (KR); Beom-Sik Bae, Suwon-si (KR); Sang-Wook Kwon, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/817,110

(22) Filed: Mar. 12, 2020

(65) Prior Publication Data

US 2020/0213882 A1 Jul. 2, 2020

Related U.S. Application Data

(63) Continuation of application No. 15/410,210, filed on Jan. 19, 2017, now Pat. No. 10,602,382.

(Continued)

(51) Int. Cl.
*H04W 24/04* (2009.01)
*H04W 76/30* (2018.01)
(Continued)

(52) U.S. Cl.
CPC ......... *H04W 24/04* (2013.01); *H04W 64/003* (2013.01); *H04W 76/30* (2018.02);
(Continued)

(58) Field of Classification Search
CPC ............. H04W 74/0833; H04W 76/27; H04W 52/0229; H04W 72/0413; H04W 72/14; H04W 28/0278; H04W 72/10
See application file for complete search history.

(56) References Cited

U.S. PATENT DOCUMENTS 9,730,090 B2 * 8/2017 Johansson ............. H04W 76/18
2012/0276936 A1 11/2012 Ahn et al.
(Continued)

FOREIGN PATENT DOCUMENTS

WO 2015/002466 A2 1/2015
WO 2015/076639 A1 5/2015

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 13)", Jan. 7, 2016, pp. 1-509, 3GPP TS 36.331 V13.0.0, 650 Route des Lucioles—Sophia Antipolis Valbonne—France.

*Primary Examiner* — Shukri Taha
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as long term evolution (LTE). A method for processing a radio link failure (RLF) by a user equipment (UE) supporting a dual-connectivity communication system is provided. The method includes determining a state of a radio link with a first base station using a reference signal, transmitting to a second base station, when the radio link with the first base station fails, a message indicating that the radio link with the first base station fails, redetermining the state of the radio link with the first base station using a reference signal of the first base station during a predetermined time, and switching, after the predetermined time, a data transmission line when the radio link with the first base station fails.

22 Claims, 30 Drawing Sheets

Related U.S. Application Data

(60) Provisional application No. 62/280,294, filed on Jan. 19, 2016, provisional application No. 62/291,893, filed on Feb. 5, 2016, provisional application No. 62/314,575, filed on Mar. 29, 2016, provisional application No. 62/325,733, filed on Apr. 21, 2016.

(51) Int. Cl.
*H04W 76/34* (2018.01)
*H04W 64/00* (2009.01)
*H04W 76/15* (2018.01)
*H04W 92/20* (2009.01)

(52) U.S. Cl.
CPC ............ *H04W 76/34* (2018.02); *H04W 76/15* (2018.02); *H04W 92/20* (2013.01)

(56) References Cited

U.S. PATENT DOCUMENTS

| | | | |
|---|---|---|---|
| 2013/0033998 A1* | 2/2013 | Seo | H04W 24/08 370/252 |
| 2013/0316713 A1 | 11/2013 | Xu et al. | |
| 2014/0155114 A1* | 6/2014 | Wu | H04W 36/03 455/509 |
| 2014/0171083 A1 | 6/2014 | Zhang et al. | |
| 2015/0043492 A1 | 2/2015 | Baek et al. | |
| 2015/0071250 A1 | 3/2015 | Dai et al. | |
| 2015/0373602 A1 | 12/2015 | Hampel et al. | |
| 2015/0373772 A1 | 12/2015 | Watanabe et al. | |
| 2016/0037425 A1* | 2/2016 | Van Lieshout | H04W 36/30 370/332 |
| 2016/0044735 A1 | 2/2016 | Ohta | |
| 2016/0066237 A1* | 3/2016 | Kato | H04W 24/10 370/331 |
| 2016/0100341 A1 | 4/2016 | Wu et al. | |
| 2016/0174124 A1* | 6/2016 | Basu Mallick | H04W 74/006 370/331 |
| 2016/0219475 A1 | 7/2016 | Kim | |
| 2016/0242226 A1 | 8/2016 | Fushiki et al. | |
| 2016/0285679 A1* | 9/2016 | Dudda | H04W 24/10 |
| 2017/0170941 A1* | 6/2017 | Yang | H04L 5/0098 |

\* cited by examiner

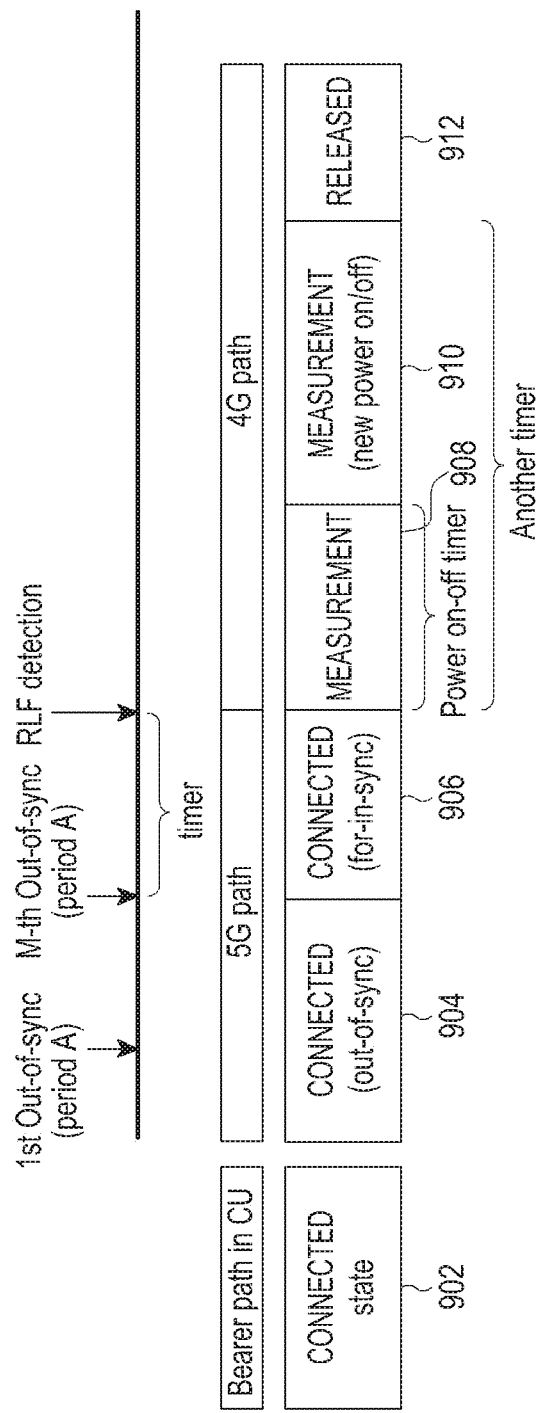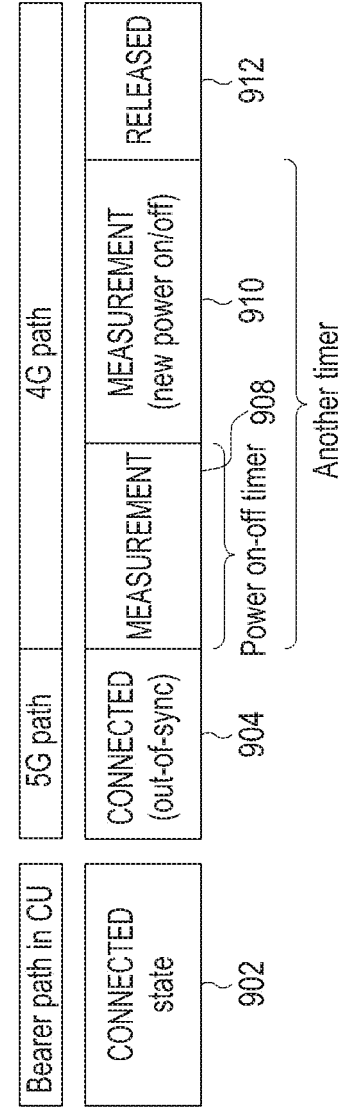
FIG.9A
FIG.9B

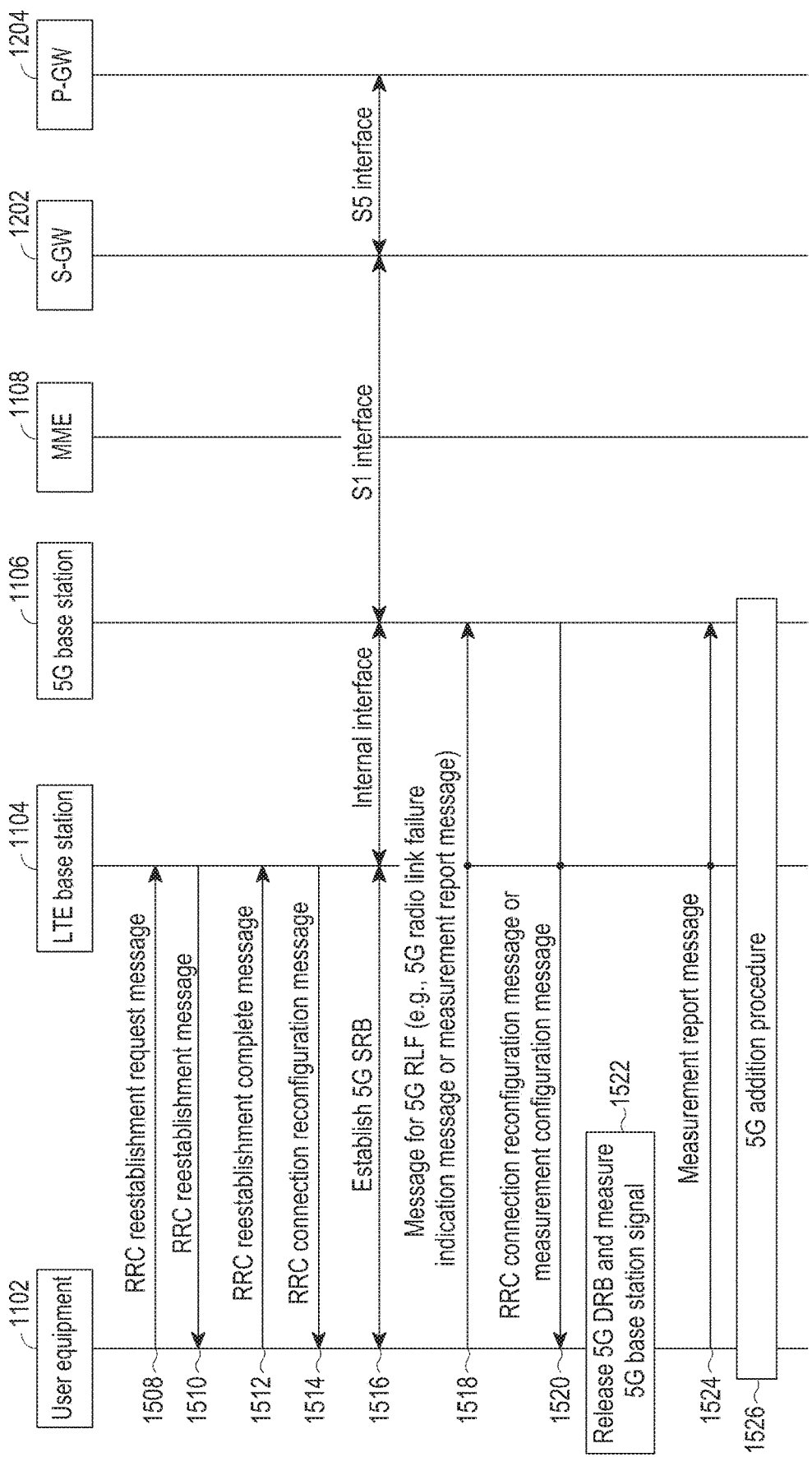

RADIO LINK FAILURE PROCESSING METHOD AND APPARATUS THEREFOR

CROSS-REFERENCE TO RELATED APPLICATION(S)

This application is a continuation application of prior application Ser. No. 15/410,210, filed on Jan. 19, 2017, which was based on and claimed priority under 35 U.S.C § 119(e) of a U.S. Provisional application Ser. No. 62/280,294, filed on Jan. 19, 2016, in the U.S. Patent and Trademark Office, of a U.S. Provisional application Ser. No. 62/291,893, filed on Feb. 5, 2016, in the U.S. Patent and Trademark Office, of a U.S. Provisional application Ser. No. 62/314,575, filed on Mar. 29, 2016, in the U.S. Patent and Trademark Office, and of a U.S. Provisional application Ser. No. 62/325,733, filed on Apr. 21, 2016, in the U.S. Patent and Trademark Office, the disclosure of each of which is incorporated by reference herein in its entirety.

TECHNICAL FIELD

The present disclosure relates to a method and apparatus for processing a radio link failure (RLF) determined to occur between a user equipment (UE) and a first base station in a dual-connectivity communication system.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a transient stage where LTE system and 5G communication system co-exist, a need exists for a method allowing the two systems to support a user equipment (UE) while mutually interworking with the UE.

At issue is a method for addressing problems that arise in two systems when a UE interworks with the two systems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide an apparatus and method for processing a radio link failure (RLF) by a user equipment (UE) for switching a data transmission line when the radio link with a first base station continues to fail.

In accordance with an aspect of the present disclosure, a method for processing a radio link failure (RLF) by a user equipment (UE) supporting a dual-connectivity communication system is provided. The method includes determining a state of a radio link with a first base station using a reference signal, transmitting to a second base station, when the radio link with the first base station fails, a message indicating that the radio link with the first base station fails, redetermining the state of the radio link with the first base station using a reference signal of the first base station during a predetermined time and switching, after the predetermined time, a data transmission line when the radio link with the first base station fails.

In accordance with another aspect of the present disclosure, a UE supporting a dual-connectivity communication system and processing an RLF is provided. The UE includes at least one processor configured to determine a state of a radio link with a first base station using a reference signal, redetermine the state of the radio link with the first base station using a reference signal of the first base station during a predetermined time and switch, when the radio link with the first base station fails, a data transmission line after the predetermined time, and a terminal configured to transmit to a second base station, when the radio link with the first base station fails, a message indicating that the radio link with the first base station fails.

In accordance with another aspect of the present disclosure, a method for supporting an RLF of a UE by a first base station in a dual-connectivity communication system is provided. The method includes receiving, from a second base station, a message indicating that a radio link between the UE and the first base station fails, determining whether the radio link with the UE fails depending on whether a message is received from the second base station indicating that the radio link between the UE and the first base station is recovered within a predetermined time and transmitting, when the radio link with the UE is determined as failed, a message indicating a switch of a data transmission line to the second base station.

In accordance with another aspect of the present disclosure, a first base station supporting an RLF of a UE in a dual-connectivity communication system is provided. The a first base station includes a transceiver configured to receive, from a second base station, a message indicating that a radio link between the UE and the first base station fails and transmit, when the radio link with the UE is determined as failed, a message indicating a switch of a data transmission line to the second base station, and at least one processor configured to determine whether the radio link with the UE fails depending on whether a message is received from the second base station indicating that the radio link between the UE and the first base station is recovered within a predetermined time.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A and 9B are views illustrating a state of a UE as per changes in time according to an embodiment of the present disclosure;

FIGS. 15A and 15B are flowcharts illustrating a processing method when a 5G RLF and an LTE RLF occur according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the various embodiments described below are separate from one another for ease of description, at least two or more of the various embodiments may be combined together within such a range where they do not conflict one another.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Figure 1:
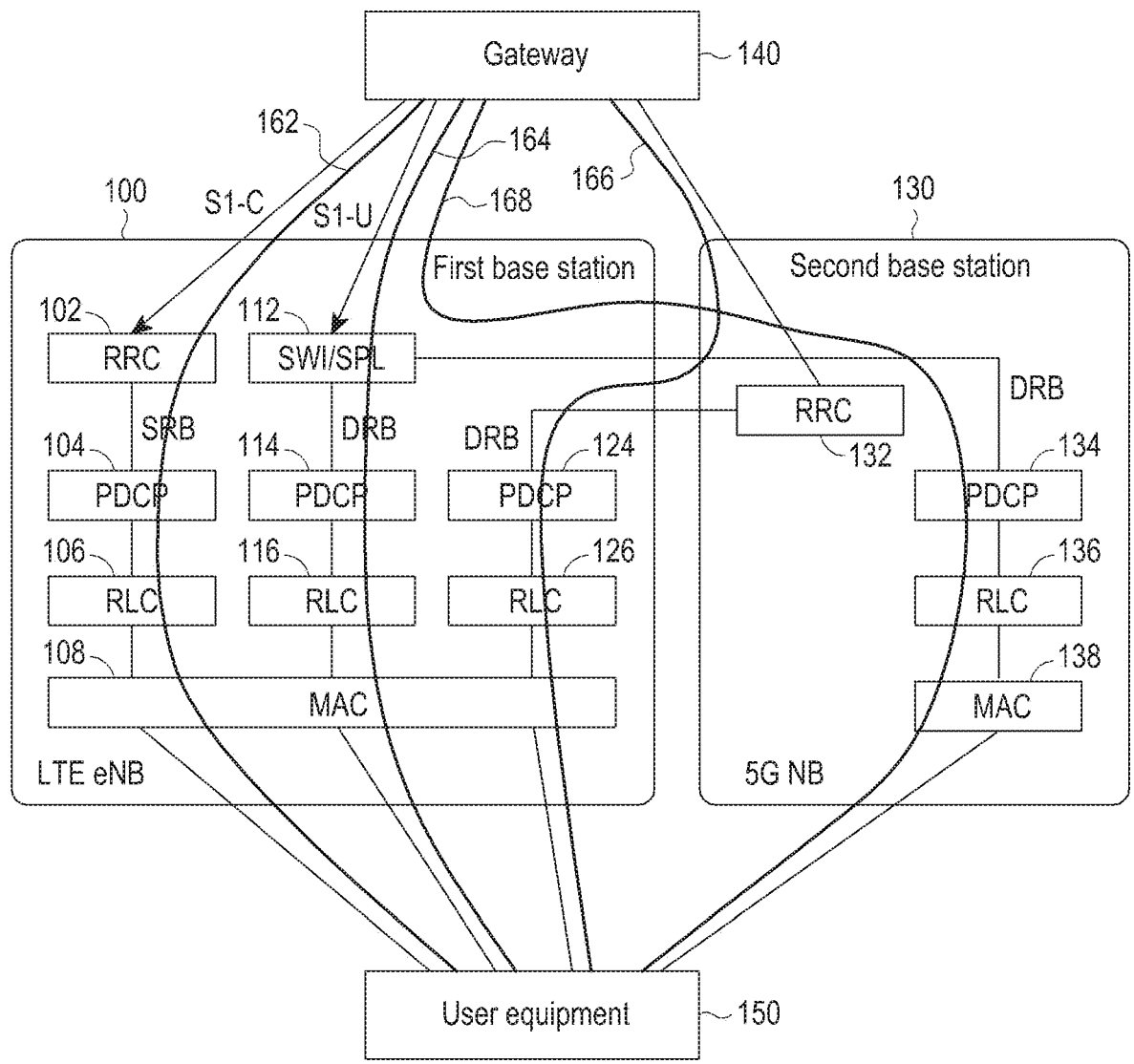
FIG. 1 is a view illustrating a configuration in which a first base station is connected with a second base station according to an embodiment of the present disclosure.

FIG. 1 is a view illustrating a configuration in which a first base station is connected with a second base station according to an embodiment of the present disclosure.

Referring to FIG. 1, a first base station 100 may be a long-term evolution base station (LTE eNB) supporting a fifth-generation (5G) base station, and a second base station 130 may be a 5G base station.

To distinguish between LTE base stations not supporting the 5G base station and LTE base station supporting the 5G base station, the LTE base stations not supporting the 5G base station are denoted 'legacy LTE base stations,' and the LTE base stations supporting the 5G base station are denoted 'LTE base stations,' in this disclosure.

The first base station 100 may include a radio resource control (RRC) unit 102, radio link protocol (RLC) units 106, 116, and 126, a switching (SWI)/splitting (SPL) unit 112, packet data convergence protocol (PDCP) units 104, 114, and 124, and a medium access control (MAC) unit 108. The second base station may include the same configuration as the first base station 100, including an RRC unit 132, a PDCP unit 134, an RLC unit 136, and a MAC unit 138.

Although the units are separately described hereinafter, they may also be configured in a single unit. For example, the RLC units 106, 116, and 126 in the first base station 100 may be configured in a single RLC unit, or the PDCP unit 104 and the RLC unit 106 may be configured in a single unit.

The first base station 100 and the second base station 130 may be connected with a gateway (GW) 140 and a user equipment (UE) 150.

However, as an example here, the second base station 130 alone cannot play a role as a base station but can together with another base station, i.e., the first base station 100. However, the first base station 100 alone may also serve as a base station.

For example, where the first base station 100 alone functions as a base station, the flow of a control signal (signaling radio bearer (SRB)) (referred to hereinafter as 'LTE SRB') 162 is as follows. The first base station 100 receives a control signal from the gateway 140. The received control signal is transmitted to the UE 150 via the RRC unit 102, PDCP unit 104, RLC unit 106, and MAC unit 108 of the first base station 100. This describes an example of downlink. For uplink, the control signal may be transmitted in a reverse direction. That is, the control signal from the UE 150 is transmitted to the gateway 140 via the MAC unit 108, the RLC unit 106, the PDCP unit 104, and the RRC unit 102.

As another example, where the first base station 100 alone functions as a base station, the flow of data (data radio bearer (DRB)) (referred to hereinafter as 'LTE DRB') 164 is as follows. The first base station 100 receives data from the gateway 140. The received data is transmitted to the SWI/SPL unit 112 of the first base station 100. The SWI/SPL unit 112 controls the direction of transmission of the data. Specifically, when the SWI/SPL unit 112 is an SWI unit, the SWI unit may select one of the first base station 100 or the second base station 130 and transmit the received data. Alternatively, when the SWI/SPL unit 112 is an SPL unit, the SPL unit may the received data through both the first base station 100 and the second base station 130. When the SWI/SPL unit 112 controls the direction of transmission of data to be directed to the first base station 100, the received data may be transmitted to the UE 150 via the PDCP unit 114, the RLC unit 116, and the MAC unit 108. This describes an example of downlink. For uplink, the data may be transmitted in a reverse direction.

The second base station 130 may directly transmit/receive the control signal to/from the gateway 140, but cannot directly transmit/receive the data. The second base station 130 may directly transmit/receive the data to/from the UE 150 but cannot directly transmit/receive the control signal.

As another example, when the second base station 130, together with the first base station 100, plays a role as a base station, the flow of a control signal (hereinafter, referred to as '5G SRB' or 'LTE DRB for 5G RRC') 166 is as follows. The second base station 130 may directly receive the control signal from the gateway 140. However, since the second base station 130 cannot directly transmit the control signal to the UE 150, the control signal is transmitted through the RRC unit 132 of the second base station 130 to the first base station 100. The control signal is transmitted to the UE 150 via the PDCP unit 124, RLC unit 126, and MAC unit 108 of the first base station 100. This describes an example of downlink. For uplink, the control signal may be transmitted in a reverse direction.

Further, although, in the example here, the RRC unit 132 alone is included in the second base station 130, a PDCP unit and a RLC unit may also be included therein. That is, any case where the control signal flow cannot be done only by the second base station 130 may fall within various embodiments of the present disclosure.

As another example, when the second base station 130, together with the first base station 100, plays a role as a base station, the flow of data (hereinafter, referred to as '5G DRB') 168 is as follows. Since the second base station 130 cannot directly receive data from the gateway 140, the first base station 100 instead receives the data. The first base station 100 may control the SWI/SPL unit 112 to transmit the received data to the second base station 130. The received data may be transmitted to the UE 150 via the PDCP unit 134, the RLC unit 136, and the MAC unit 138 of the second base station 130. Selectively, the first base station 100 may control the SWI/SPL unit 112 to transmit the received data to the PDCP unit 134 of the second base station 130 and the PDCP unit 114 of the first base station 100. In this case, the received data may be transmitted from the second base station 100 and the second base station 130 to the UE 150. This describes an example of downlink. For uplink, the data may be transmitted in a reverse direction.

Likewise, the SWI/SPL unit 112 may also be included in the second base station 130. In this case, the data may be transmitted/received not through the first base station 100 but through the second base station 130.

For illustration purposes, the first base station is referred to as an LTE base station, and the second base station is referred to as a 5G base station. However, the first base station and the second base station are not limited to the LTE base station and the 5G base station. That is, they may also be applicable to combinations of radio access technologies (RATs) with the concept of dual connectivity. For example, a sub-6 GHz RAT may be the first base station, and an above-6 GHz RAT may be the second base station. In this case, the RRC unit of the RAT serving as an anchor or functioning to control may play a role as the RRC unit in the 5G base station.

According to the present disclosure, described is a method for detecting and processing a radio link failure (RLF) between the first base station or second base station and the UE under a configuration as shown in FIG. 1. Hereinafter, an RLF between the UE 150 and the first base station, i.e., LTE base station, is denoted a 'LTE RLF,' and an RLF between the UE 150 and the second base station, i.e., 5G base station, is denoted a '5G RLF.' The 5G RLF may influence the 5G DRB described above, and the LTE RLF may influence all of the LTE SRB, LTE DRB, and 5G SRB described above. Inter-device radio links may be established independently without affecting each other.

FIGS. 2A, 2B, 3A, 3B, 4A, 4B, 5A, and 5B are flowcharts illustrating processing methods as per detection of a 5G RLF according to various embodiments of the present disclosure.

Figure 2A:
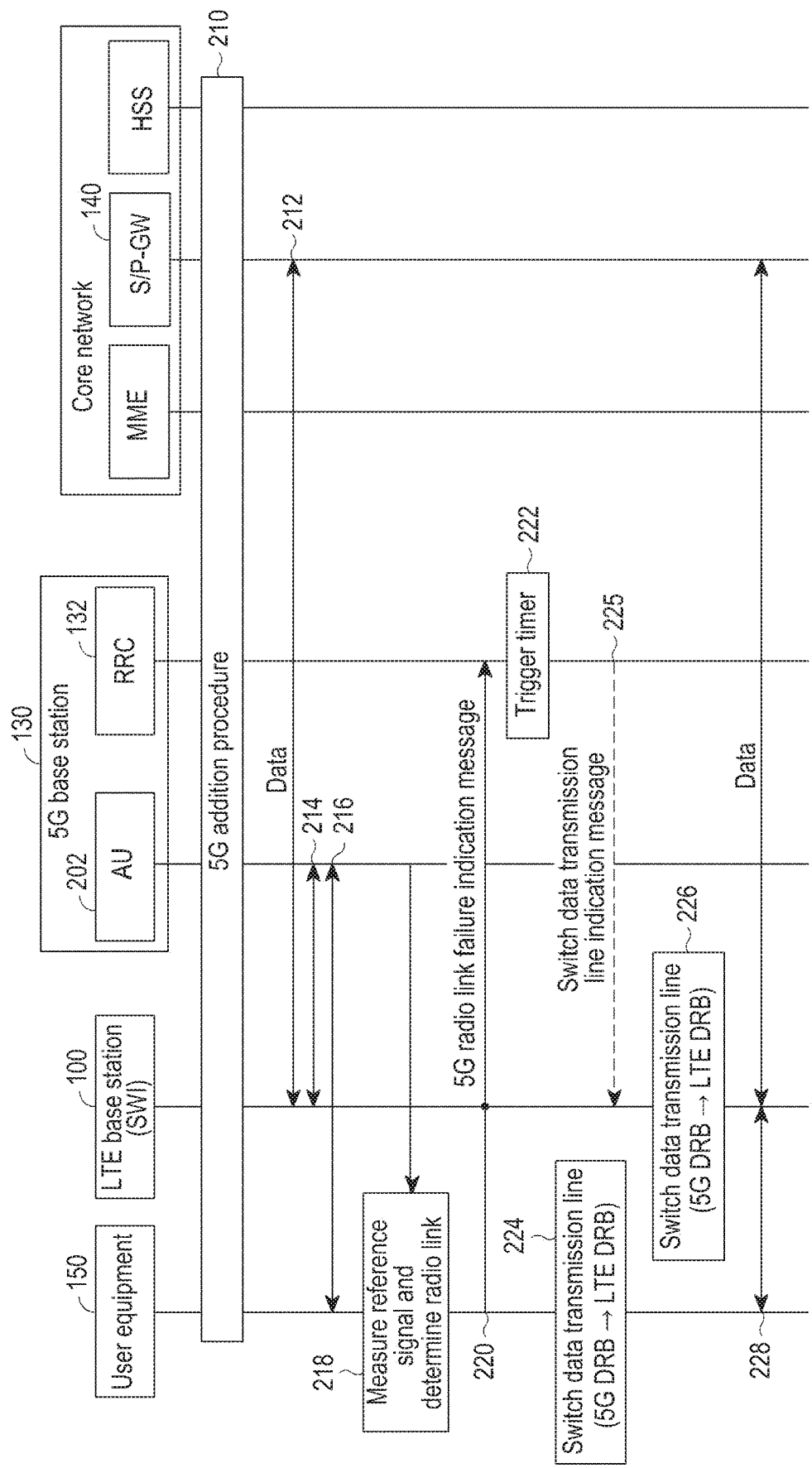
FIGS. 2A and 2B are flowcharts illustrating a processing method as per detection of a 5th-generation (5G) radio link failure (RLF) according to a first embodiment of the present disclosure.
Figure 2B:
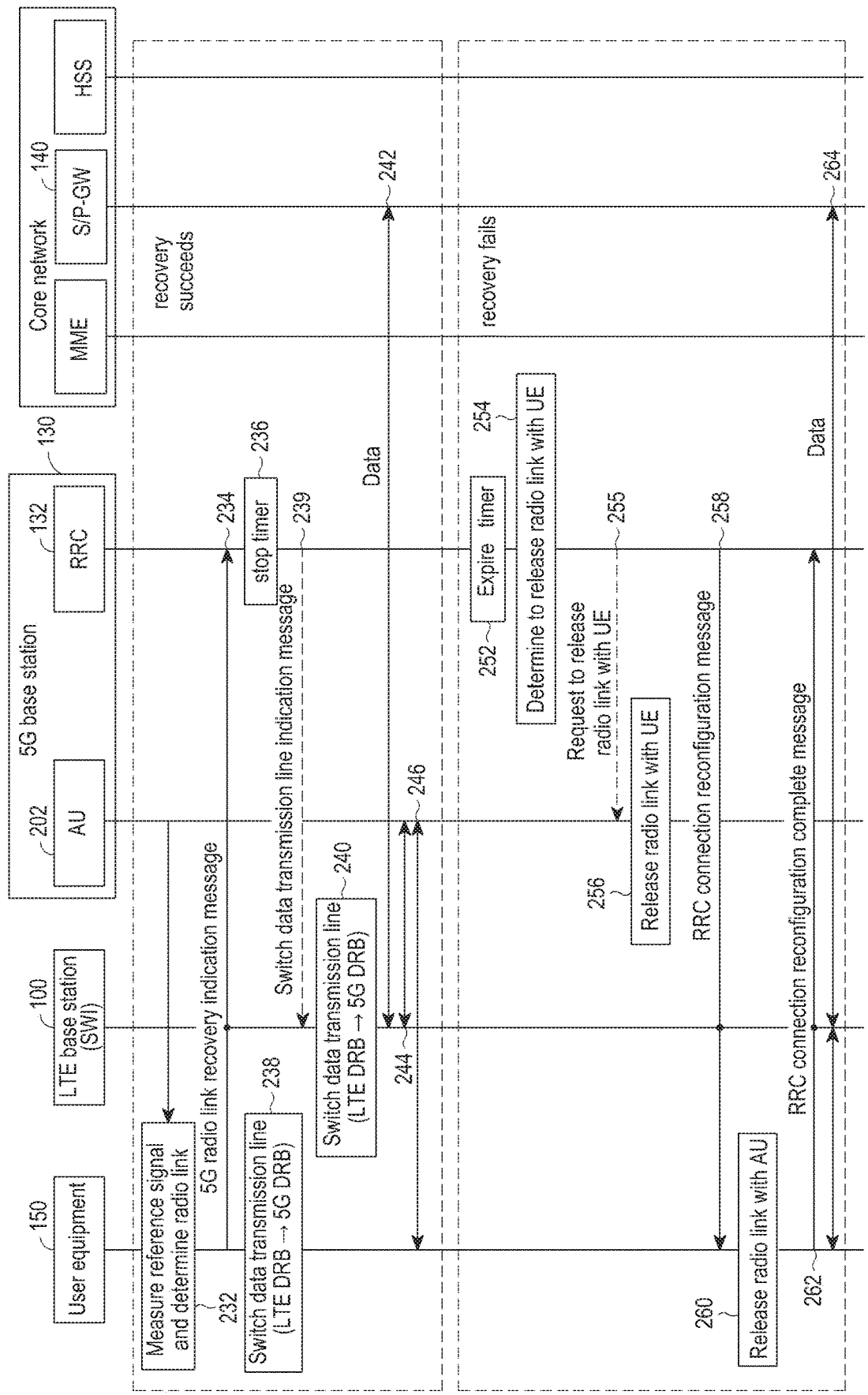

FIGS. 2A and 2B are flowcharts illustrating a processing method as per detection of a 5G RLF according to a first embodiment of the present disclosure.

Referring to FIGS. 2A and 2B, the UE 150 is connected through a 5G addition procedure (or a 5G base station addition procedure) to the LTE base station 100, the access unit (AU) 202 and RRC unit 132 in the 5G base station 130, and the service/packet-data network gateway (S/P-GW) 140 at (210). Here, the AU 202 means a unit processing data in the 5G base station, and examples thereof may include a PDCP unit, a RLC unit, and a MAC unit. Here, the 5G addition procedure refers to a procedure in which the UE connects to the LTE base station, 5G base station, and gateway.

On downlink, the S/P GW 140 in the core network transmits data to the LTE base station 100 at (212). The LTE base station 100 supports the 5G base station 130. Thus, the LTE base station 100 supports the SWI unit to transmit the data to the AU 202 in the 5G base station 130 at (214). The AU 202 transmits the data to the UE 150 at (216). On uplink, data transmission is performed in an opposite direction of that on downlink. The following description focuses on downlink.

The UE 150 determines whether the radio link with the AU 202 is good while data is transmitted and received. For example, when M reference signals continuously measured are determined to be not good (out-of-sync), the UE 150 may determine that the radio link is not good, i.e., an RLF at (218). To detect and determine whether there is an RLF, various methods may be put to use depending on configurations. Here, the reference signals may include a synchronization signal, a broadcasting channel (CH) signal, a beam measurement reference signal, a demodulation reference signal (DMRS), a channel state information reference signal (CSI-RS), a beam refinement signal, and other various non-data reference signals.

The UE 150 report a message indicating the RLF with the AU 202 (e.g., a 5G RLF indication message, a 5G radio link problem indication message, a 5G radio link loss message, or a 5G measurement report message) to the RRC unit 132 using a control signal transmission line, i.e., the 5G SRB at (220).

The RRC unit 132, upon receiving the report, operates a timer (e.g., a T313) at (222).

Upon determining that the radio link with the AU 202 fails, the UE 150 switches the data transmission line from the 5G DRB to the LTE DRB at (224). As an example, the UE 150 may use a switch to release the data transmission line with the AU 202 and reestablish to radio protocol stack for LTE.

The LTE base station 100 receives an indication message as to the switch of the data transmission line from the RRC unit 132 at (225) and controls the SWI unit so that the data is directly transmitted to the UE 150 at (226).

Accordingly, the data is transmitted from the S/P GW 140 through the LTE base station 100 to the UE 150 at (228).

The UE 150 receives the data from the LTE base station 100 and determines whether the radio link with the AU 202 is good. The UE 150 may determine that the radio link with the AU 202 is good (in-sync) before the timer expires at (232). For example, when N reference signals continuously measured are determined to be good, the UE 150 may determine that the radio link with the AU 202 is good.

Upon determining that the radio link with the AU 202 is good, the UE 150 transmits a message indicating the recovery of radio link with the AU 202 to the RRC unit 132 using the control signal transmission line, i.e., 5G SRB at (234).

The RRC unit 132 stops the timer upon receiving the message at (236).

Upon determining that the radio link with the AU 202 is recovered, the UE 150 switches the data transmission line from the LTE DRB to the 5G DRB at (238). That is, the UE 150 receives data not from the LTE base station 100 but from the AU 202.

Upon receiving an indication message as to the switch of the data transmission line from the RRC unit 132 at (239), the LTE base station 100 switches the data transmission line from the LTE DRB to the 5G DRB at (240). That is, the LTE base station 100 controls the SWI unit to transmit data to the AU 202.

When the radio link with the AU 202 recovers, the S/P GW 140 transmits data to the LTE base station 100 at (242), and the LTE base station 100 controls the SWI unit to transmit the data to the AU 202 at (244). Thereafter, the AU 202 transmits the data to the UE 150 at (246).

The set time of the timer may expire while the RRC unit 132 does not receive the message indicating the recovery of the radio link with the AU 202 at (252).

The RRC unit 132 may determine that the radio link with the UE 150 fails and determine to release the radio link with the UE 150 at (254).

The RRC unit 132 requests the AU 202 to release the radio link with the UE 150 at (255).

The AU 202 releases the radio link with the UE 150 at (256). Specifically, the AU 202 may release the resource allocated to the UE 150.

The RRC unit 132 transmits an RRC connection reconfiguration message indicating that the radio link with the AU 202 and the UE 150 has been released to the UE 150 at (258). The RRC connection reconfiguration message is transmitted through the LTE base station 100 to the UE 150.

When receiving the RRC connection reconfiguration message, the UE 150 releases the radio link with the AU 202 at (260).

The UE 150 notifies the RRC unit 132 that the radio link with the AU 202 has been released using an RRC connection reconfiguration complete message at (262) In this case, the RRC connection reconfiguration complete message is transferred through the LTE base station 100 to the RRC unit 132.

Thereafter, the UE 150 transmits data to the S/P GW 140 or receives data from the S/W GW 140 through the LTE base station 100 at (264).

Figure 3A:
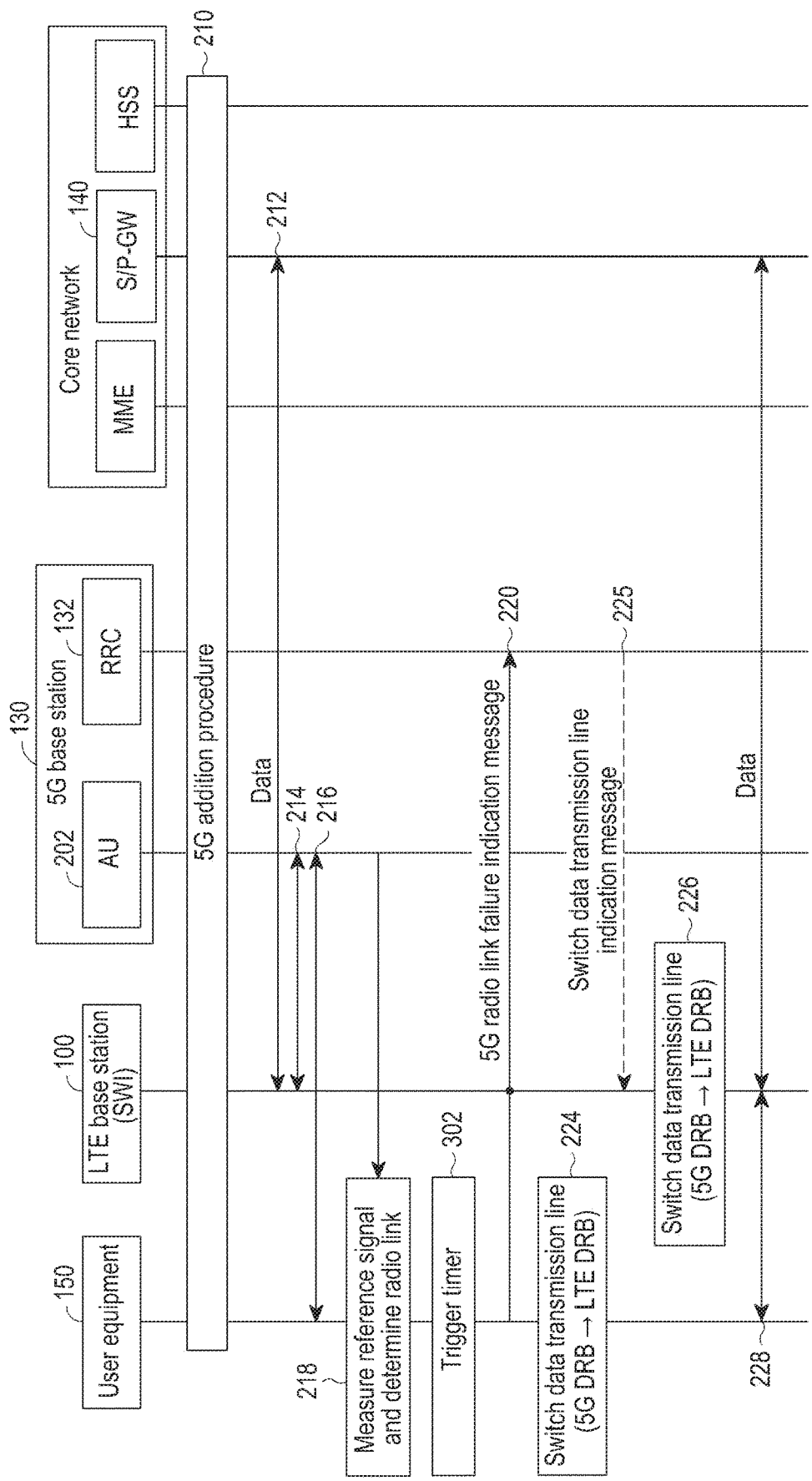
FIGS. 3A and 3B are flowcharts illustrating a processing method as per detection of a 5G RLF according to a second embodiment of the present disclosure.
Figure 3B:
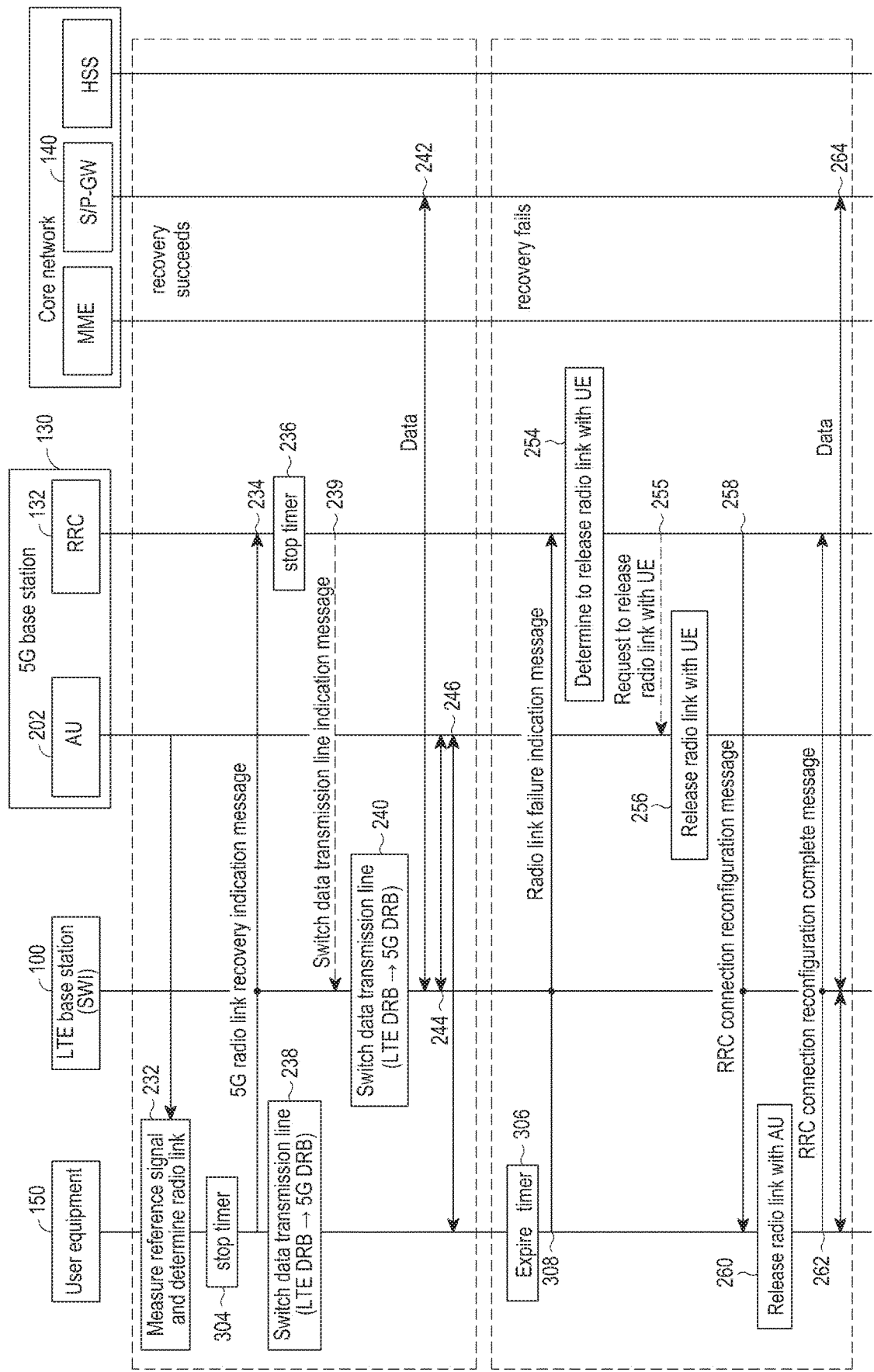

FIGS. 3A and 3B are flowcharts illustrating a processing method as per detection of a 5G RLF according to a second embodiment of the present disclosure.

This is similar to the embodiment described above in connection with FIGS. 2A and 2B. However, a difference is that the timer is operated by the UE 150, not by the RRC unit 132.

Referring to FIGS. 3A and 3B, the same configurations and operations as those in FIGS. 2A and 2B are referenced by the same reference denotations and are avoided from a detailed description or briefly described.

The UE 150, upon determining that the radio link with the AU 202 fails, operates the timer (e.g., a T313) at (302).

Upon determining that the radio link with the AU 202 is good before the timer expires, the UE 150 stops the timer at (304).

Thereafter, the UE 150 switches the data transmission line to receive data from the AU 202.

The UE 150 might not determine that the radio link with the AU 202 is good until before the timer expires at (306).

The UE 150 uses an RLF indication message to inform the RRC unit 132 that the radio link with the AU 202 fails at (308). The RLF indication message may be transferred through the LTE base station 100 to the RRC unit 132.

The other operations are the same as those described above in connection with FIGS. 2A and 2B.

Figure 4A:
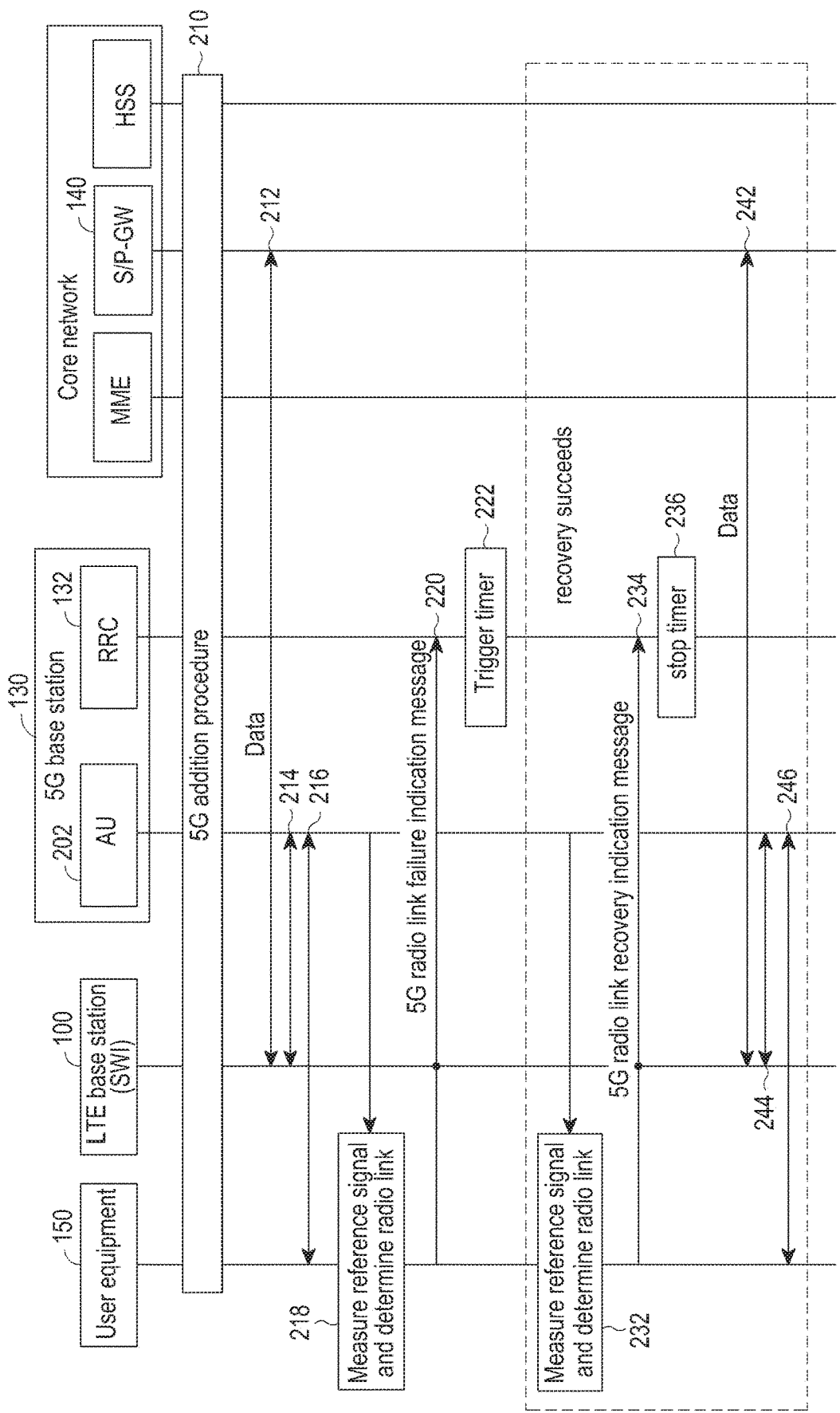
FIGS. 4A and 4B are flowcharts illustrating a processing method as per detection of a 5G RLF according to a third embodiment of the present disclosure.
Figure 4B:
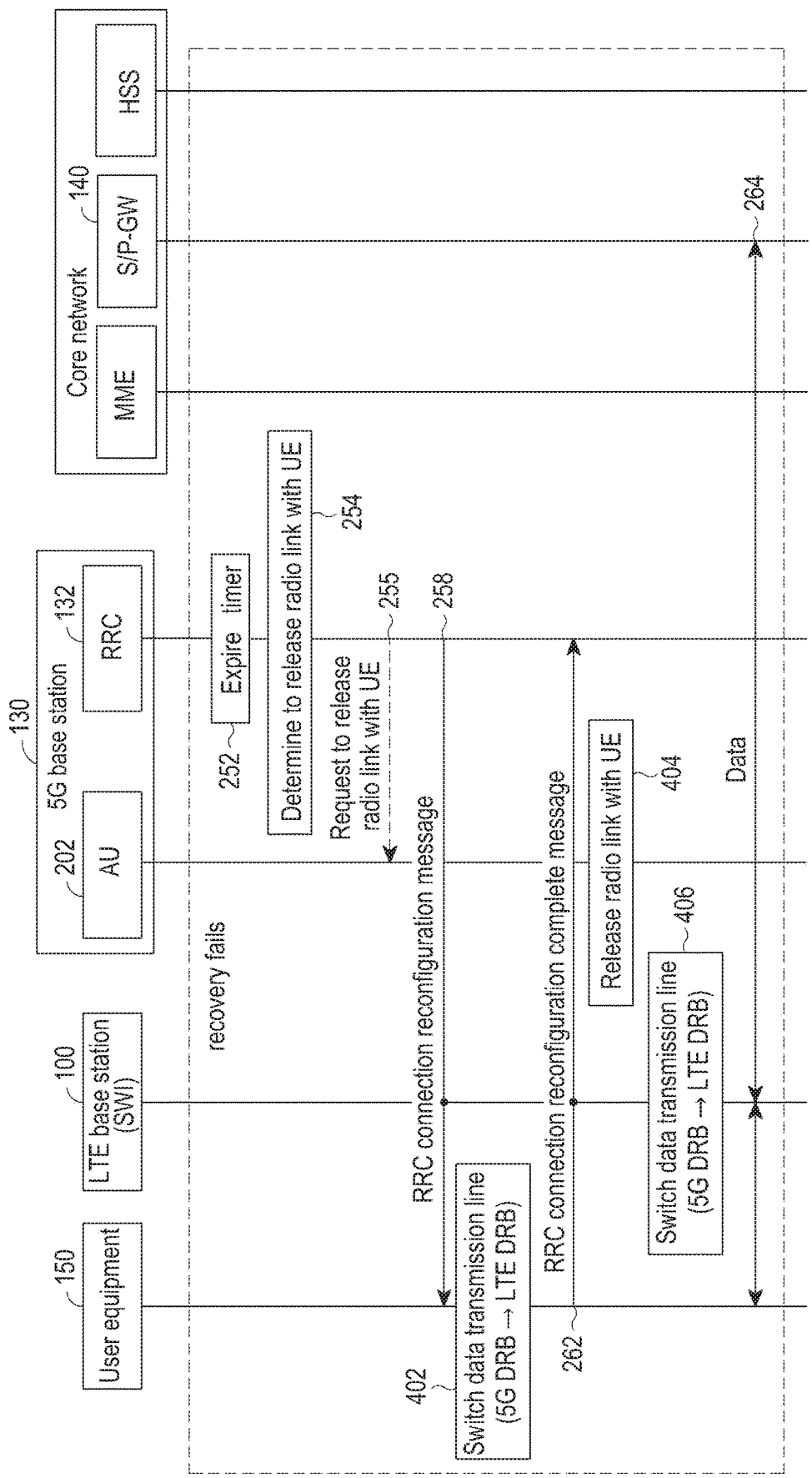

FIGS. 4A and 4B are flowcharts illustrating a processing method as per detection of a 5G RLF according to a third embodiment of the present disclosure.

This is similar to the first embodiment described above in connection with FIGS. 2A and 2B. However, a difference is that, although the UE 150 determines that the radio link with the AU 202 fails, the data transmission line is not switched.

Referring to FIGS. 2A and 2B, when the UE 150 determines that the radio link with the AU 202 fails, the data transmission line is switched, and data is transmitted and received. However, in the third embodiment, the data transmission line is not switched, and thus, data cannot be transmitted or received.

Referring to FIGS. 4A and 4B, the same configurations and operations as those in FIGS. 2A and 2B are referenced by the same reference denotations and are avoided from a detailed description or briefly described.

Operations (operations 224 to 226 and 238 to 240) related to the switch of the data transmission line are excluded from operations 210 to 246, and the other operations are the same as those in FIGS. 2A and 2B.

The RRC unit 132 might not receive a message indicating the recovery of radio link until before the timer expires at (252). When the timer expires, the RRC unit 132 may determine that the radio link with the UE 150 fails and determine to release the radio link with the UE 150 at (254).

The RRC unit 132 requests the AU 202 to release the radio link with the UE 150 at (255).

The RRC unit 132 transmits an RRC connection reconfiguration message indicating that the radio link has been released to the UE 150 at (258). The RRC connection reconfiguration message is transmitted through the LTE base station 100 to the UE 150.

When receiving the RRC connection reconfiguration message, the UE 150 switches the data transmission line from the 5G DRB to the LTE DRB at (402). That is, the UE 150 switches the data transmission line so that data is received not from the AU 202 but from the LTE base station 100.

The UE 150 notifies the RRC unit 132 that the radio link with the AU 202 has been released using an RRC connection reconfiguration complete message (262) In this case, the RRC connection reconfiguration complete message is transferred through the LTE base station 100 to the RRC unit 132.

The AU 202 releases the radio link with the UE 150 at (404).

Further, the LTE base station 100 also controls the SWI unit to switch the data transmission line from the 5G DRB to the LTE DRB at (406).

Figure 5A:
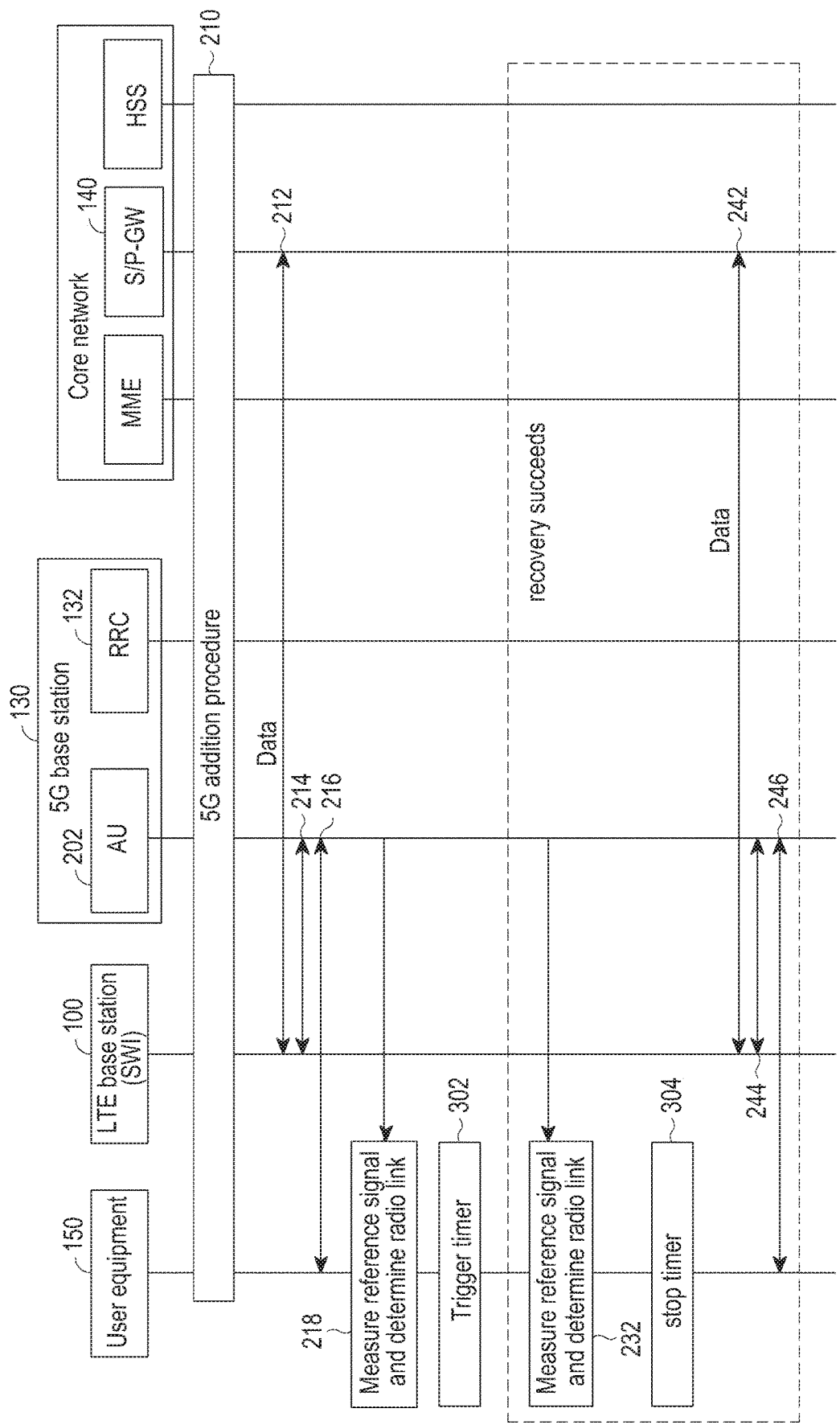
FIGS. 5A and 5B are flowcharts illustrating a processing method as per detection of a 5G RLF according to a fourth embodiment of the present disclosure.
Figure 5B:
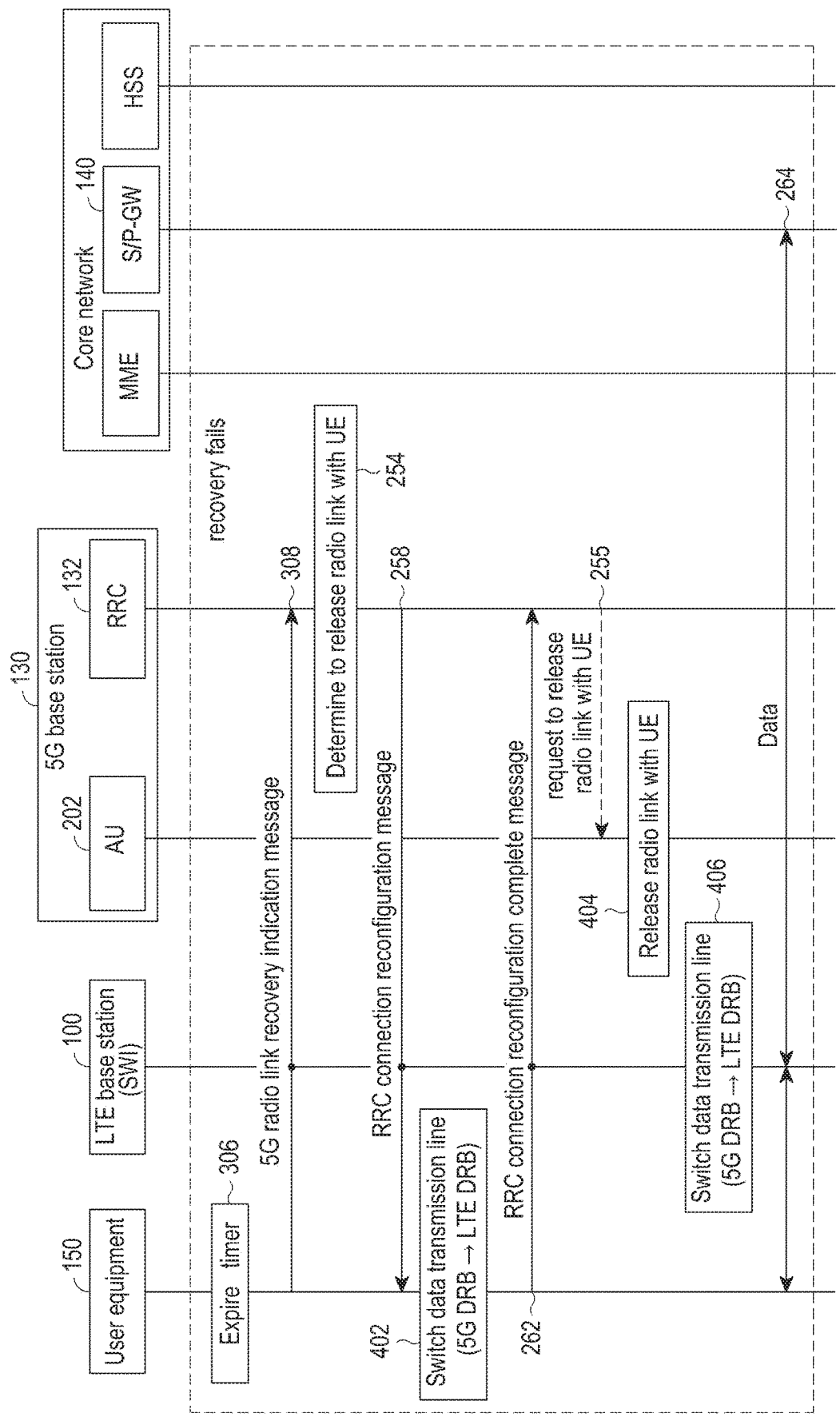

FIGS. 5A and 5B are flowcharts illustrating a processing method as per detection of a 5G RLF according to a fourth embodiment of the present disclosure.

The fourth embodiment is similar to the various embodiments described above in connection with FIGS. 3A, 3B, 4A, and 4B. However, differences are that the timer is operated not by the RRC unit 132 but by the UE 150, and although the UE 150 determines that the radio link with the AU 202 fails, the data transmission line is not switched. Referring to FIGS. 5A and 5B, the same configurations and operations as those in FIGS. 2A, 2B, 3A, 3B, 4A, and 4B are referenced by the same reference denotations and are omitted from a detailed description.

Figure 6:
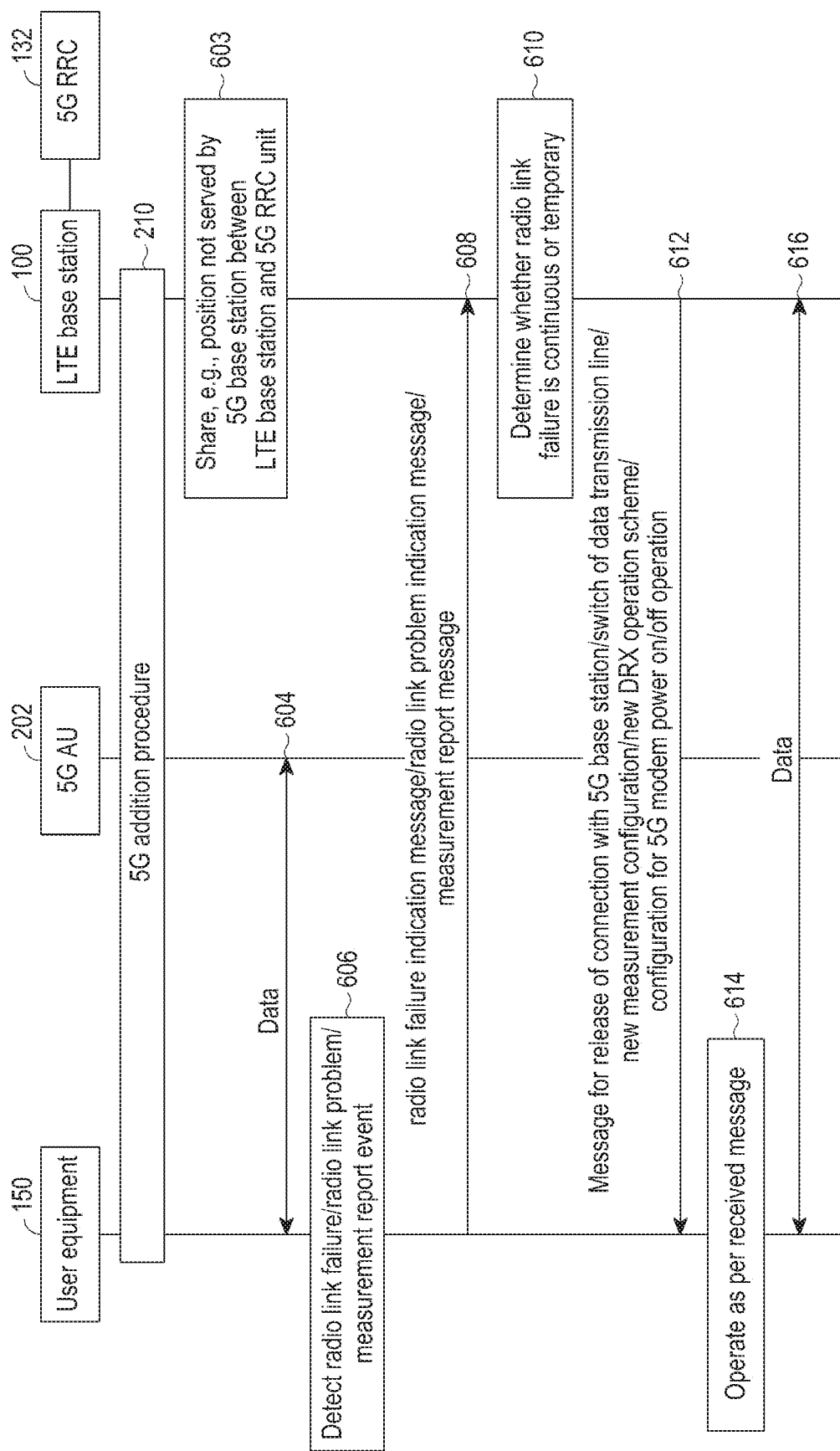
FIG. 6 is a view illustrating a specific method for processing a radio link release between a 5G base station and a user equipment (UE) as per detection of a 5G RLF according to an embodiment of the present disclosure.

FIG. 6 is a view illustrating a specific method for processing a radio link release between a 5G base station and a UE as per detection of a 5G RLF according to an embodiment of the present disclosure.

Referring to FIG. 6, the UE 150 is connected with the LTE base station 100, the 5G AU 202, and the 5G RRC unit 132 through a 5G additional procedure. The LTE base station 100 and the 5G RRC unit 132 mutually share information about the position where services by the 5G base station do not reach, i.e., information about the coverage hole of the 5G base station at (603). Here, the 5G AU 202 and the 5G RRC unit 132 are internal components of the 5G base station.

The UE 150 transmits and receives data with the 5G AU 202 at (604).

The UE 150 may detect the occurrence of at least any one of an RLF with the 5G AU 202, a radio link problem, and a measurement report event while transmitting and receiving data at (606).

The UE 150 transmits a message indicating an RLF with the 5G AU 202, i.e., an RLF indication message, radio link problem indication message, and measurement report message to the LTE base station 100 and/or the 5G RRC unit 132. Here, the UE 150 may transmit, with them, location information about the UE 150, reference signal received power (RSRP), reference signal received quality (RSRQ), or received signal strength indicator values for the LTE base station 100 and/or a neighbor LTE base station, transmit beam identifications (IDs) of the 5G base station and/or another neighbor 5G base station and information about the radio signal strength of transmit beams at (608).

The LTE base station and/or the 5G RRC unit 132 may be aware of information relating to the base stations, such as relative location information about the 5G base station, relative and/or absolute information about the position not reached by the coverage of the 5G base station, and information about a particular beam of the other 5G base station covering the position not reached by the service of the 5G base station. Thus, the LTE base station 100 and/or the 5G RRC unit 132 may determine whether the RLF is caused because of temporary beam blocking or because the UE 150 is positioned where the service of the 5G base station is not reached using the information included in the received message and the information relating to the base stations at (610). In other words, the LTE base station 100 and/or the 5G RRC unit 132 may determine whether the RLF is continuous or temporary.

Upon determining that the RLF is attributed to deviation of the UE 150 from the coverage of the 5G base station, the LTE base station 100 and/or the 5G RRC unit 132 may transmit, to the UE 150, at least one of a message to release the link with the 5G base station, a message to switch the data transmission line, a new measurement configuration message, a new discontinuous reception (DRX) operation scheme message, and a 5G modem power on/off operation-related configuration message at (612). In this case, other RAT links (e.g., wireless-fidelity (Wi-Fi) or LTE) may be used depending on whether the 5G base station is available.

Here, the 5G modem power on/off operation-related configuration may include information indicating the power-on/off depending on, e.g., an exponential random variable, a particular random variable, or a constant time. Further, the 5G modem power on/off operation-related configuration may include information about the power on/off of the overall modem and/or the power on/off of a particular module, e.g., a receiving module or transmitting module.

The measurement configuration may include at least one of a preference to a particular frequency band, a measurement interval, and a RAT search command.

The UE 150 operates according to the received message at (614). For example, the UE 150 may release the link with the 5G AU 202. Then, the UE 150 transmits data to the LTE base station 100 at (616).

Figure 7:
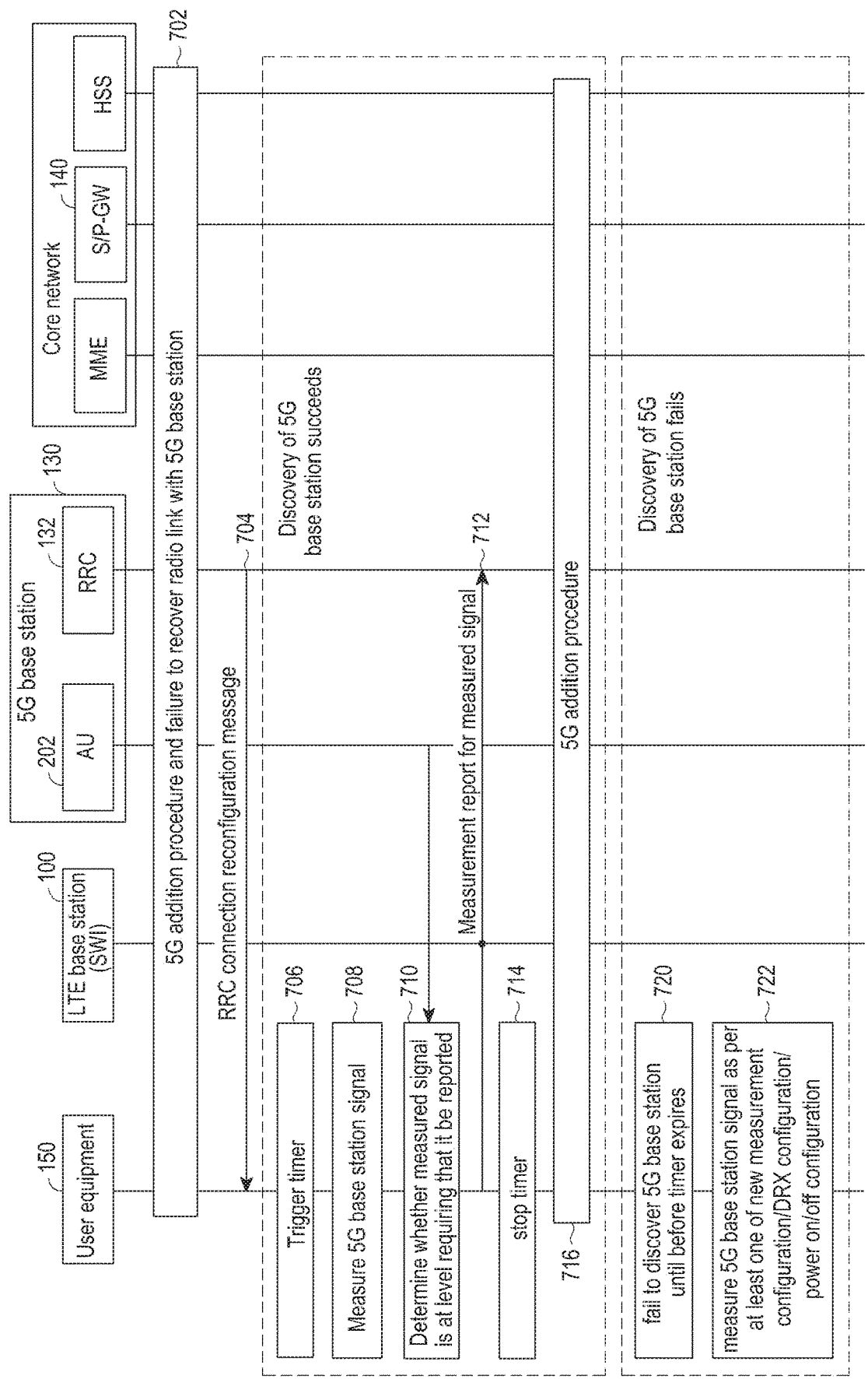
FIG. 7 is a flowchart illustrating a processing method after release of a radio link between a UE and a 5G base station according to the first embodiment of the present disclosure.
Figure 8:
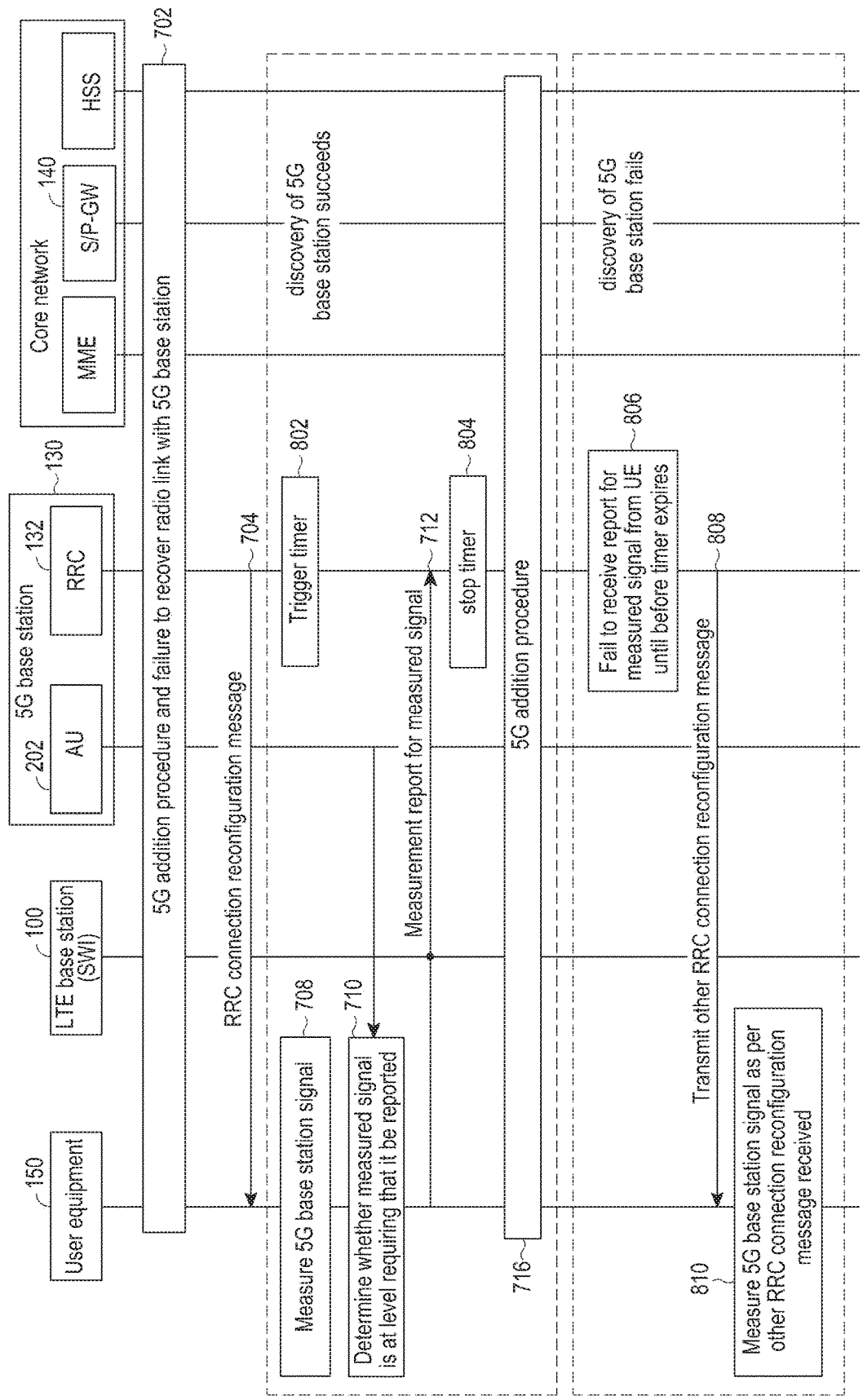
FIG. 8 is a flowchart illustrating a processing method after release of a radio link between a UE and a 5G base station according to the second embodiment of the present disclosure.

FIGS. 7 and 8 are flowcharts illustrating processing methods after release of a radio link between a UE and a 5G base station according to an embodiment of the present disclosure.

Specifically, when the radio link with the 5G base station fails, the UE attempts a radio link with the 5G base station, i.e. recover the radio link, according to at least any one of those described above in connection with FIGS. 2A, 2B, 3A, 3B, 4A, 4B, 5A and 5B. However, operations after the UE fails even the attempt and thus releases the radio link with the 5G base station are described with reference to FIGS. 7 and 8.

FIG. 7 is a flowchart illustrating a processing method after release of a radio link between a UE and a 5G base station according to the first embodiment of the present disclosure.

Referring to FIG. 7, the UE 150 is connected with the LTE base station 100, the AU 202 and the RRC unit 132 in the 5G base station 130, and the S/P GW 140 through a 5G additional procedure. Thereafter, when the radio link with the AU 202 is determined to fail, the UE 150 attempts to recover the radio link with the 5G base station according to at least any one of those described above in connection with FIGS. 2A, 2B, 3A, 3B, 4A, 4B, 5A, and 5B but fails at (702).

The RRC unit 132 transfers an RRC connection reconfiguration message to the UE 150 at (704). The RRC connection reconfiguration message may contain at least one of a release of link with the AU 202 and a switch of data transmission line.

The UE 150 starts to discover a new 5G base station for a radio link. The UE 150 operates the timer to discover a new 5G base station for a predetermined time at (706). Discovering a new 5G base station for the predetermined time may save the UE 150 from power consumption. The timer may automatically be operated when a particular condition is met, e.g., release of link with the 5G base station.

The UE 150 measures a signal from the 5G base station to perform a 5G addition procedure at (708).

The UE 150 determines whether the measured signal is suitable enough to perform the 5G addition procedure and thus report to the 5G base station at (710). For example, it may be preset that the measured signal is supposed to be reported when it has a magnitude not less than a predetermined value.

Upon determining that the measured signal is in such a level as to be reported, the UE 150 sends a report for the measured signal to the 5G base station having sent the signal at (712). In this case, the 5G base station to which the UE 150 has sent the report may be the 5G base station 130 to which it was linked before.

Discovering the 5G base station, the UE 150 stops the timer at (714).

The UE 150 is relinked to the LTE base station 100, the AU 202, the RRC unit 132, and the S/P GW 140 through the 5G addition procedure at (716).

The UE 150 might not discover a 5G base station until before the timer expires at (720).

The UE 150 may measure the signal from the 5G base station according to at least any one of a new measurement configuration, DRX configuration, and power on/off configuration at (722). The new measurement configuration, DRX configuration, and power on/off configuration may be ones changed directly by the UE 150 or ones received from a higher network. The measurement configuration may include, e.g., a preference to a particular frequency band, a measurement interval, and a RAT search order. These are ones for adjusting unconditional signal measurement for discovery of a 5G base station under the determination by the UE 150 that the UE 150 is positioned where no service of the 5G base station is reached. Thus, the UE 150 may be avoided from unnecessary energy waste.

The measurement configuration, DRX configuration, and power on/off configuration have been described above in detail with reference to FIG. 6.

FIG. 8 is a flowchart illustrating a processing method after release of a radio link between a UE and a 5G base station according to the second embodiment of the present disclosure.

This is similar to the embodiment described above in connection with FIG. 7. However, a difference is that the timer is operated not by the UE 150 but by the RRC unit 132.

Referring to FIG. 8, the same configurations and operations as those in FIG. 7 are referenced by the same reference denotations and are avoided from a detailed description or briefly described.

When receiving an RRC connection reconfiguration complete message from the UE 150 after sending the RRC connection reconfiguration message, the RRC unit 132 operates the timer at (802). After sending the RRC connection reconfiguration message, the RRC unit 132 may operate the timer.

Thereafter, when the UE 150 reports the measured signal, the RRC unit 132 stops the timer at (804).

However, the RRC unit 132 may not receive the measured signal from the UE 150 until before the timer expires at (806).

The RRC unit 132 may transmit another RRC connection reconfiguration message to the UE 150 at (808). The other RRC connection reconfiguration message may include at least any one of the measurement configuration, the DRX configuration, and the power on/off configuration.

The UE 150 may measure a signal from the 5G base station according to the other RRC connection reconfiguration message received at (810). As described above in connection with FIG. 7, the UE 150 may thus be avoided from unnecessary energy waste.

FIGS. 9A and 9B are views illustrating a state of a UE as per changes in time according to an embodiment of the present disclosure.

FIG. 9A shows an example where a timer is used, and FIG. 9B shows an example where no timer is used.

Referring to FIG. 9A, the UE remains in link with the 5G RRC unit at (902).

Thereafter, the UE may determine that the radio link with the 5G RRC unit fails. Also in this case, the UE remains linked with the 5G RRC unit at (904).

The UE operates the timer and measures a signal as to whether the radio link with the 5G RRC unit is recovered. Unless the radio link with the 5G RRC unit is recovered until the timer expires, the UE may determine that the radio link with the 5G RRC unit fails. In this case, the UE still remains linked with the 5G RRC unit at (906).

The UE may switch the data transmission line to measure a signal from the 5G base station at (908).

Upon failure to measure the signal from the 5G base station during a predetermined time, the UE may measure the signal of the 5G base station according to the RRC connection reconfiguration, e.g., by switching power on/off at (910).

However, upon still failing to measure the signal of the 5G base station during the predetermined time, the UE releases the link with the 5G RRC unit without measuring the 5G base station signal any longer at (912).

FIG. 9B shows an example in which the timer in FIG. 9A is not used. Thus, the UE does not determine whether the radio link with the 5G RRC unit is recovered while the timer is operated. The UE may immediately switch the data transmission line to measure a signal from the 5G base station at (908).

Figure 10:
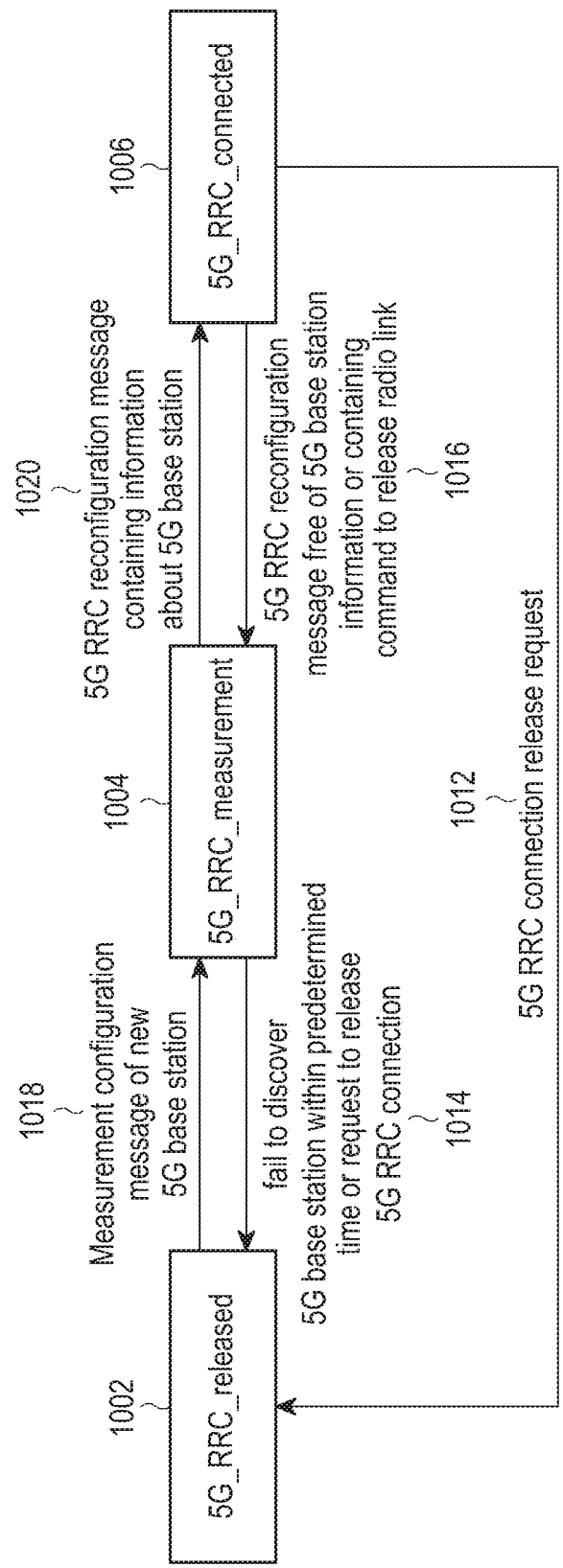
FIG. 10 is a state diagram illustrating a UE according to an embodiment of the present disclosure.

FIG. 10 is a state diagram illustrating a UE according to an embodiment of the present disclosure.

Referring to FIG. 10, the UE may come in three states depending on the state of the radio link with the 5G RRC unit.

The first state is a 5G_RRC_released state 1002, the second state is a 5G_RRC_measurement state 1004, and the third state is a 5G_RRC_connected state 1006.

The 5G_RRC_released state 1002 is a state in which the UE does not have the context of the 5G RRC unit. When the 5G base station, e.g., the 5G RRC unit, requests to release the 5G RRC link while the UE is in the 5G_RRC_connected state 1006, the UE turns into the 5G_RRC_released state 1002 at (1012). When the UE fails to discover a proper 5G base station for a predetermined time or the 5G RRC unit requests to release the 5G RRC link in the 5G_RRC_measurement state 1004, the UE may switch into the 5G_RRC_released state 1002 at (1014).

The 5G_RRC_measurement state 1004 is a state in which the UE is not in the state of being connected with a particular 5G base station but measures a signal to discover a proper 5G base station. When receiving a 5G RRC connection reconfiguration message containing a command to release the radio link or free of information about the 5G base station in the 5G_RRC_connected state 1006, the UE turns into the 5G_RRC_measurement state 1004 at (1016). When receiving a measurement configuration message of a new 5G base station from the LTE base station in the 5G_RRC_released state 1002, the UE turns into the 5G_RRC_measurement state 1004 at (1018).

The 5G_RRC_connected state 1006 is a state in which the UE is wirelessly linked with a particular 5G base station, e.g., the 5G RRC unit. Further, in the 5G_RRC_connected state 1006, the UE has the context of the 5G RRC unit and transmits or receives data to/from the 5G base station. The UE receives the 5G RRC connection reconfiguration message containing information about the 5G base station in the 5G_RRC_measurement state 1004, and upon succeeding in the 5G addition procedure, switches into the 5G_RRC_connected state 1006 at (1020).

However, the release of the radio link with the AU described above in connection with FIGS. 2A, 2B, 3A, 3B, 4A, 4B, 5A, 5B, 6 to 8, 9A, and 9B does not mean that the UE switches into the 5G_RRC_released state 1002 but means that the UE switches into the 5G_RRC_measurement state 1004.

The processing method considering only the 5G RLF has been described thus far.

FIGS. 11, 12, 13A, 13B, 14A, 14B, 15A, 15B, 16A, 16B, 17A, and 17B show a processing method when an LTE RLF arises in addition to the 5G RLF.

Figure 11:
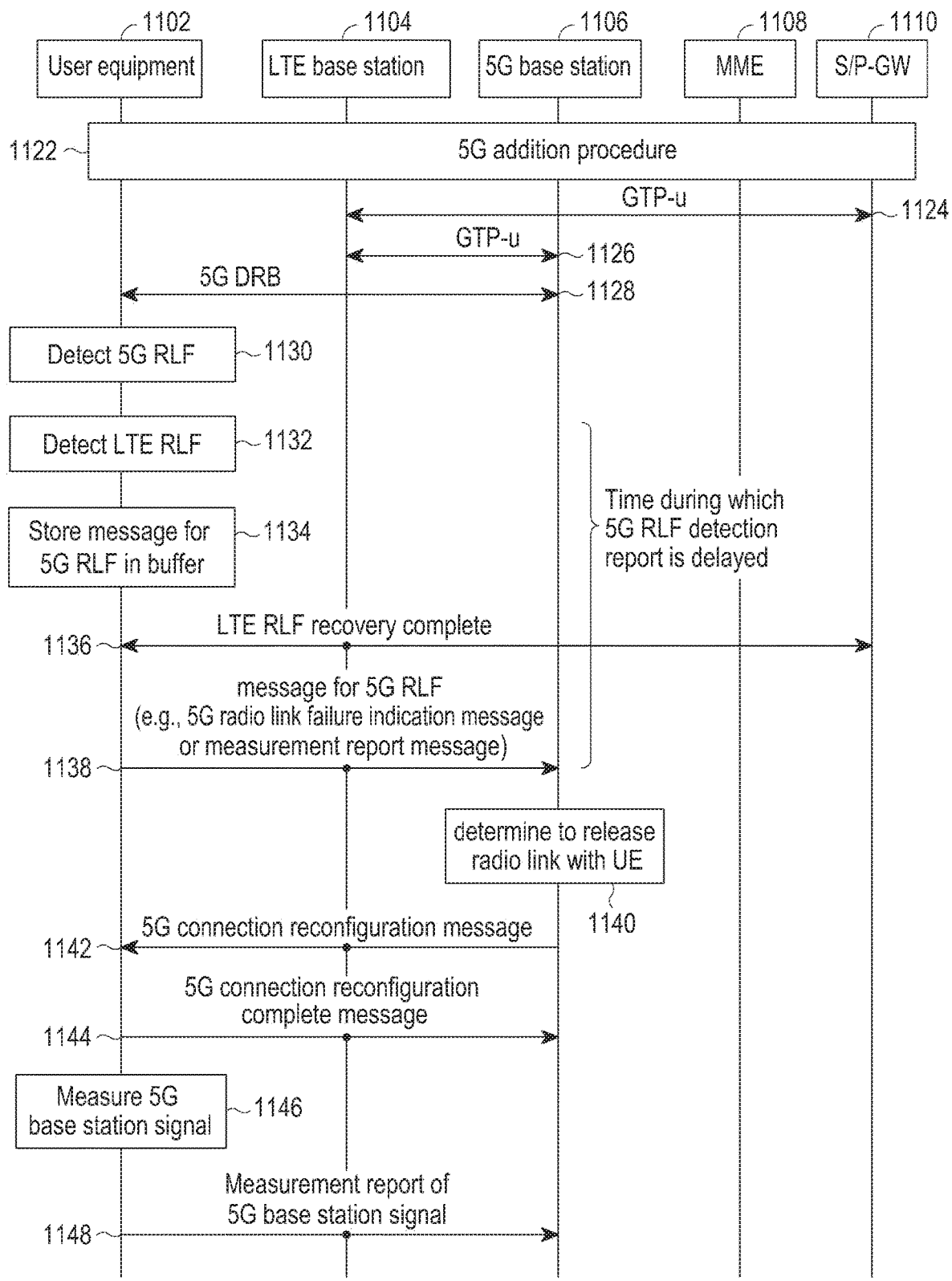
FIG. 11 is a flowchart illustrating a processing method when a temporary long term evolution (LTE) RLF, other than a 5G RLF, occurs according to an embodiment of the present disclosure.

FIG. 11 is a flowchart illustrating a processing method when a temporary LTE RLF, other than a 5G RLF, occurs according to an embodiment of the present disclosure.

Referring to FIG. 11, a UE 1102 performs a 5G base station addition procedure with an LTE base station (LTE eNB) 1104, a 5G base station 1106, a mobility management entity (MME) 1108, and a serving/packet data network-gateway (S/P GW) 1110 at (1122).

The LTE base station 1104 and the S/P GW 1110 may transmit and receive data using a user general packet radio service (GPRS) tunneling protocol (GTP-u) at (1124).

The LTE base station 1104 and the 5G base station 1106 may also transmit and receive data using a user GPRS tunneling protocol (GTP-u) at (1126).

The UE 1102 and the 5G base station 1106 may transmit and receive data using the 5G DRB at (1128). That is, the UE 1102 may directly transmit and receive data with the 5G base station.

The UE 1102 may detect an RLF with the 5G base station 1106 (hereinafter, a 5G RLF) at (1130).

Further, the UE 1102 may detect an RLF with the LTE base station 1104 (hereinafter, an LTE RLF) at (1132). An example is when the UE 1102 is positioned where communication is temporarily unavailable so that the radio link with the LTE base station 1104 as well as the 5G base station 1106 is disconnected.

The UE 1102 may use the LTE DRB to report a message for the detected 5G RLF to the 5G base station 1106. The UE 1102 has detected the LTE RLF. Thus, the UE 1102 cannot transmit the message and thus stores in the buffer at (1134). Here, the message may be a separate message (e.g., a 5G radio link loss message or 5G RLF indication message) indicating the 5G RLF or an existing message (e.g., measurement report message) containing the information about the 5G RLF.

In the instant embodiment, as the LTE RLF has temporarily occurred, the radio link between the UE 1102 and the LTE base station 1104 may be recovered at (1136).

The UE 1102 transmits the message stored in the buffer to the 5G base station 1106 using the LTE DRB at (1138).

When receiving the message, the 5G base station 1106 may determine to release the radio link with the UE 1102 at (1140).

Since the 5G base station 1106 has determined to release the radio link with the UE 1102, the 5G base station 1106 may transmit a 5G RRC connection reconfiguration message to the UE 1102 through the LTE base station 1104 at (1142).

The UE 1102 may release the radio link with the 5G base station 1106 and transmit a 5G RRC connection reconfiguration complete message through the LTE base station 1104 at (1144).

The UE 1102 measures a signal to discover a 5G base station capable of a radio link at (1146).

When discovering a 5G base station capable of a radio link, e.g., when measuring a signal from the 5G base station 1106, the UE 1102 transmits a measurement report message to the 5G base station 1106 at (1148).

Figure 12:
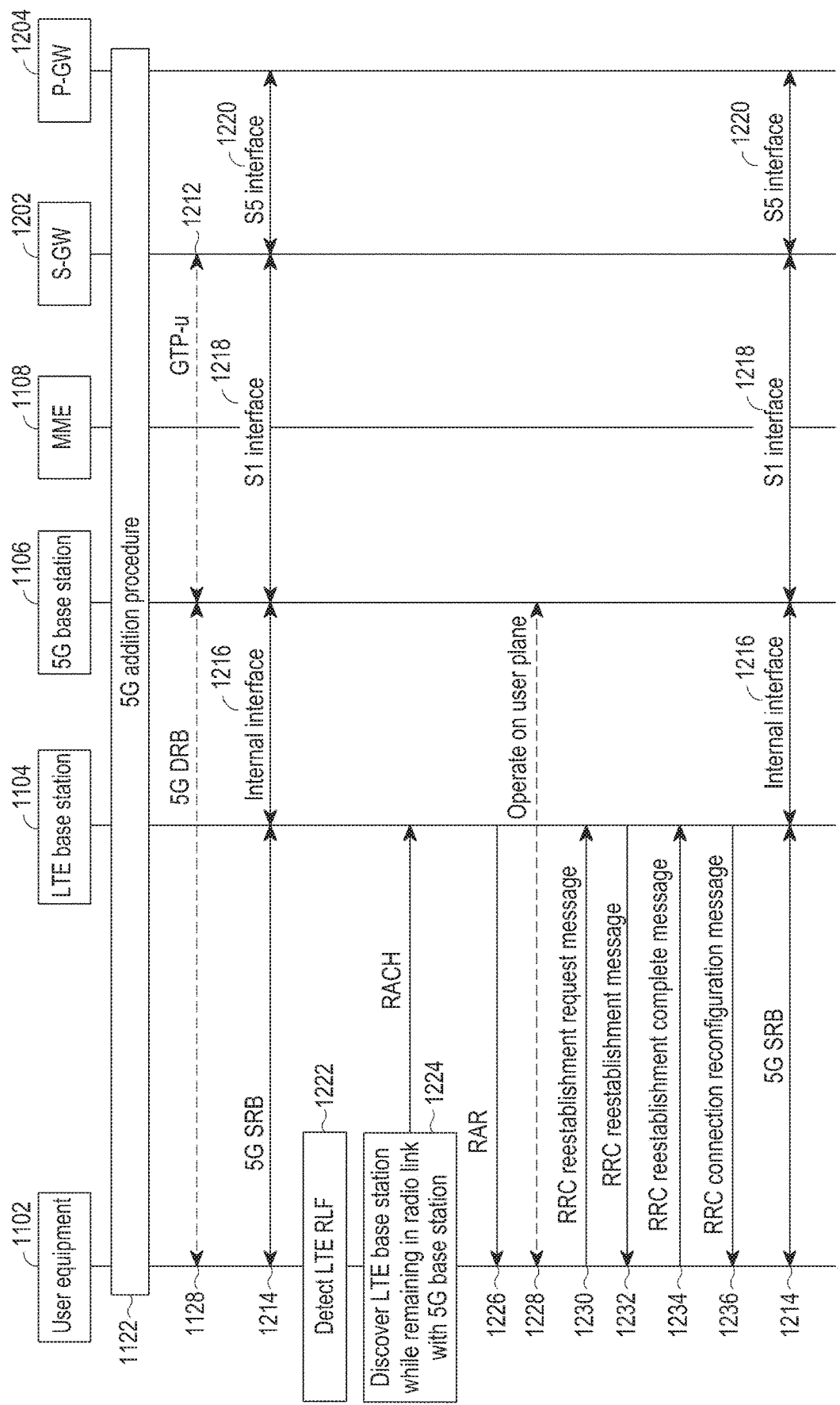
FIG. 12 is a flowchart illustrating a processing method when an LTE RLF alone occurs according to an embodiment of the present disclosure.

FIG. 12 is a flowchart illustrating a processing method when an LTE RLF alone occurs according to an embodiment of the present disclosure.

Specifically, FIG. 12 illustrates an example in which, although the radio link between the UE 1102 and the 5G base station 1106 is in a good state, the radio link with the LTE base station 1104 fails and is then reestablished.

Referring to FIG. 12, the same configurations and operations as those in FIG. 11 are referenced by the same reference denotations and are omitted from a detailed description. Further, in FIG. 12, the S/P GW is divided into a serving gateway (S-GW) 1202 and a packet data network gateway (P-GW) 1204.

The 5G base station 1106 and the S-GW 1202 may transmit and receive data using the user GTP (GTP-u) at (1212).

The UE 1102 may transmit and receive data using the LTE DRB, i.e., the 5G SRB, to/from the LTE base station 1104 to connect with the RRC unit in the 5G base station 1106 at (1214).

The LTE base station 1104 may be connected via an internal interface with the 5G base station 1106 at (1216).

The 5G base station 1106 may be connected with the S-GW 1202 via an S1 interface at (1218).

The S-GW 1202 may be connected with the P-GW 1204 via an S5 interface at (1220).

The UE 1102 may detect an RLF with the LTE base station 1104 (hereinafter, an LTE RLF) at (1222).

The UE 1102 has detected the RLF with the LTE base station 1104, but the radio link with the 5G base station 1106 has not failed. Thus the UE 1102 discovers an LTE base station while remaining in radio link with the 5G base station 1106. Here, the UE 1102 may rediscover the LTE base station 1104. When the UE 1102 discovers the LTE base station 1104, the UE 1102 transmits a random access channel (RACH) to the LTE base station 1104 at (1224).

Having received the RACH, the LTE base station 1104 transmits a random access response (RAR) to the UE 1102 at (1226).

Also in this case, the UE 1102 is not subject to the RLF with the 5G base station 1106. Thus, the UE 1102, together with the 5G base station 1106, and the 5G base station 1106, together with the S-GW 1202, may be operated on the user plane (u-plane) at (1228).

The UE 1102 transmits an RRC reestablishment request message to the LTE base station 1104 at (1230).

The LTE base station 1104 transfers an RRC reestablishment message to the UE 1102 at (1232).

The UE 1102 transmits an RRC reestablishment complete message to the LTE base station 1104 at (1234).

The LTE base station 1104 transmits an RRC connection reconfiguration message to the UE 1102 at (1236). When the RRC connection reconfiguration message contains information related to DRB establishment, the same LTE DRB as the bearer before the RLF with the LTE base station 1104 may be generated. The same LTE DRB may be the LTE DRB used for 5G RRC link or an LTE DRB for data that used to be maintained.

Although the radio link with the LTE base station 1104 has failed, the radio link with the 5G base station 1106 is still good. Thus the UE 1102 may transmit and receive data to/from the 5G base station 1106. However, the UE 1102, because of receiving control signals through the LTE base station 1104, cannot receive control signals.

Figure 13A:
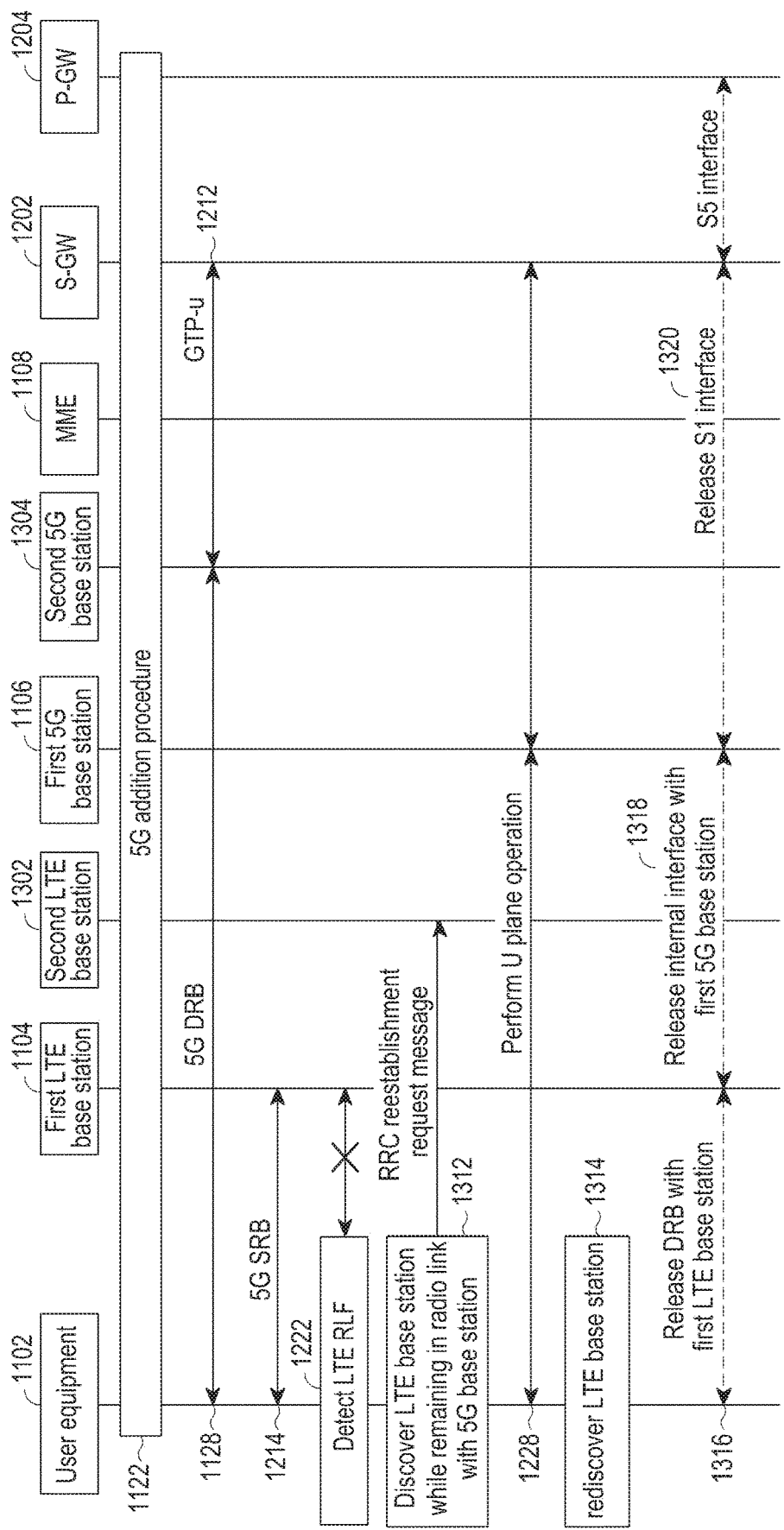
FIGS. 13A and 13B are flowcharts illustrating another processing method when an LTE RLF alone occurs according to an embodiment of the present disclosure.
Figure 13B:
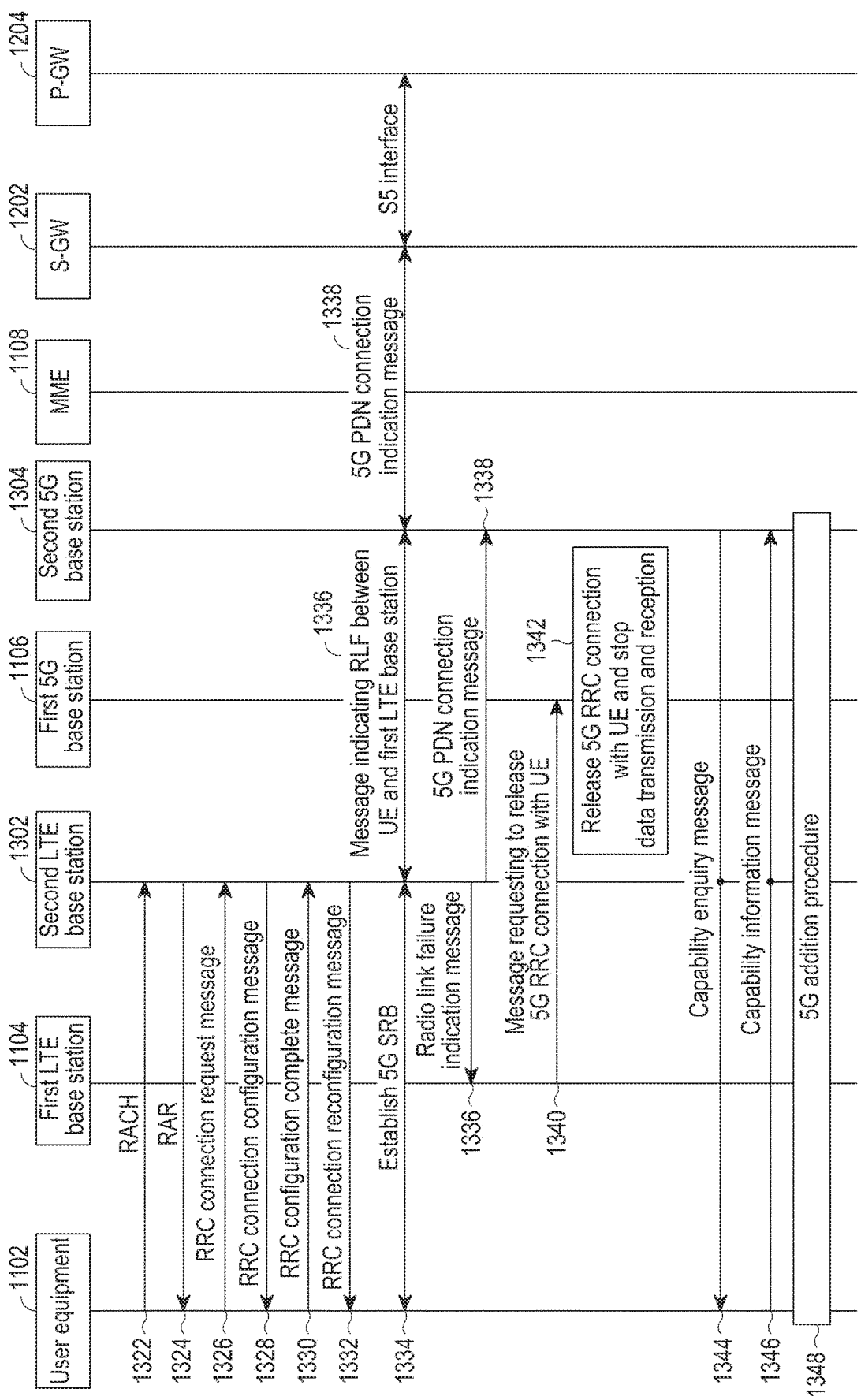

FIGS. 13A and 13B are flowcharts illustrating another processing method when an LTE RLF alone occurs according to an embodiment of the present disclosure.

Specifically, FIGS. 13A and 13B illustrate an example in which a base station discovered after the UE 1102 has detected an RLF with a first LTE base station 1104 is another LTE base station.

Referring to FIGS. 13A and 13B, the same configurations and operations as those in FIGS. 11 and 12 are referenced by the same reference denotations and are omitted from a detailed description.

Referring to FIGS. 13A and 13B, the UE 1102 may detect an RLF with the first LTE base station 1104 (i.e., an LTE RLF) at (1222). Even in this case, however, the UE 1102 does not release the radio link with the first LTE base station 1104.

Further, since the radio link with the first 5G base station 1106 has not failed, the UE 1102 discovers an LTE base station while remaining in radio link with the first 5G station 1106 at (1312). The first LTE base station 1104 that used to be in radio link, a legacy LTE base station, or a second LTE base station 1302 that had no radio link before may be discovered. The embodiment described with reference to FIGS. 13A and 13B is directed to the case where the second LTE base station 1302 with no radio link in the past is discovered.

When the second LTE base station 1302 is discovered, the UE 1102 sends an RRC connection reestablishment request message for RRC connection with the second LTE base station 1302 to the second LTE base station 1302 using information about the LTE base station that the UE 1102 owns. However, since the UE 1102 has not been linked with the second LTE base station 1302 before, and thus the second LTE base station 1302 does not bear the context for the UE 1102, the establishment fails.

The UE 1102 discovers an LTE base station capable of a radio link, and the second LTE base station 1302 is discovered again at (1314). The UE 1102 switches into an RRC_idle state. That is, the UE 1102 releases the DRB with the first LTE base station at (1316), the first LTE base station 1104 releases the internal interface with the first 5G base station 1106 at (1318), and the 5G base station 1106 also releases the S1 interface for the 5G RRC connection with the S-GW 1202 at (1320). The state of the UE 1102 is described below in greater detail.

The UE 1102 performs a random access process with the second LTE base station 1302. That is, the UE 1102 transmits a RACH to the second LTE base station 1302 at (1322), and the second LTE base station 1302 transmits a RAR to the UE 1102 at (1324).

The UE 1102 transmits an RRC connection request message to the second LTE base station 1302 at (1326), and the second LTE base station 1302 transmits an RRC connection configuration message to the UE 1102 at (1328). When the RRC connection configuration is complete, the UE 1102 transmits an RRC connection configuration complete message to the second LTE base station 1302 at (1330).

Thereafter, the second LTE base station 1302 transmits an RRC connection reconfiguration message to the UE 1102 at (1332).

The UE 1102 establishes an LTE DRB and 5G SRB based on the received RRC connection reconfiguration message at (1334). That is, the UE 1102 sends a request for LTE DRB configuration for 5G RRC connection to the second LTE base station 1302, the second LTE base station 1302 sends a request for internal interface configuration to a second 5G base station 1304, and the second 5G base station 1304 sends a request for configuration for 5G RRC connection to the MME 1108 and the S-GW 1202. Here, the second 5G base station 1304 is connected with the second LTE base station 1302, serving as a base station. The MME 1108 recognizes that the UE 1102 is one that has connected with the 5G base station before, reports the same to the second LTE base station 1302, and the second LTE base station 1302 informs the second 5G base station 1304.

The second LTE base station 1302 transmits RLF indication messages of the UE 1102 and the first LTE base station 1104 to the first LTE base station 1104 using an X2 interface at (1336).

Further, the second LTE base station 1302 transmits a 5G packet data network (PDN) connection indication message to the second 5G base station 1304 at (1338).

The first LTE base station 1104 transmits a message requesting to release the 5G RRC connection with the UE 1102 to the first 5G base station 1106 at (1340).

The first 5G base station 1106 releases the 5G RRC connection with the UE 1102 and stops data transmission and reception with the UE 1102 at (1342).

Since the second 5G base station 1304 is aware that the UE 1102 is one that has connected with the 5G base station before, the second 5G base station 1304 transmits a capability enquiry message to the UE 1102 through the second LTE base station 1302, i.e., using the LTE DRB for 5G RRC connection at (1344). The capability enquiry message may contain information (e.g., an ID) about the second LTE base station 1302 and/or the second 5G base station 1304.

In response to the capability enquiry message, the UE 1102 transmits a capability information message about the capability information of the UE 1102 to the second 5G base station 1304 at (1346).

Thus, the UE 1102 may perform a 5G addition procedure to wirelessly connect with the second 5G base station 1304 at (1348).

Figure 14A:
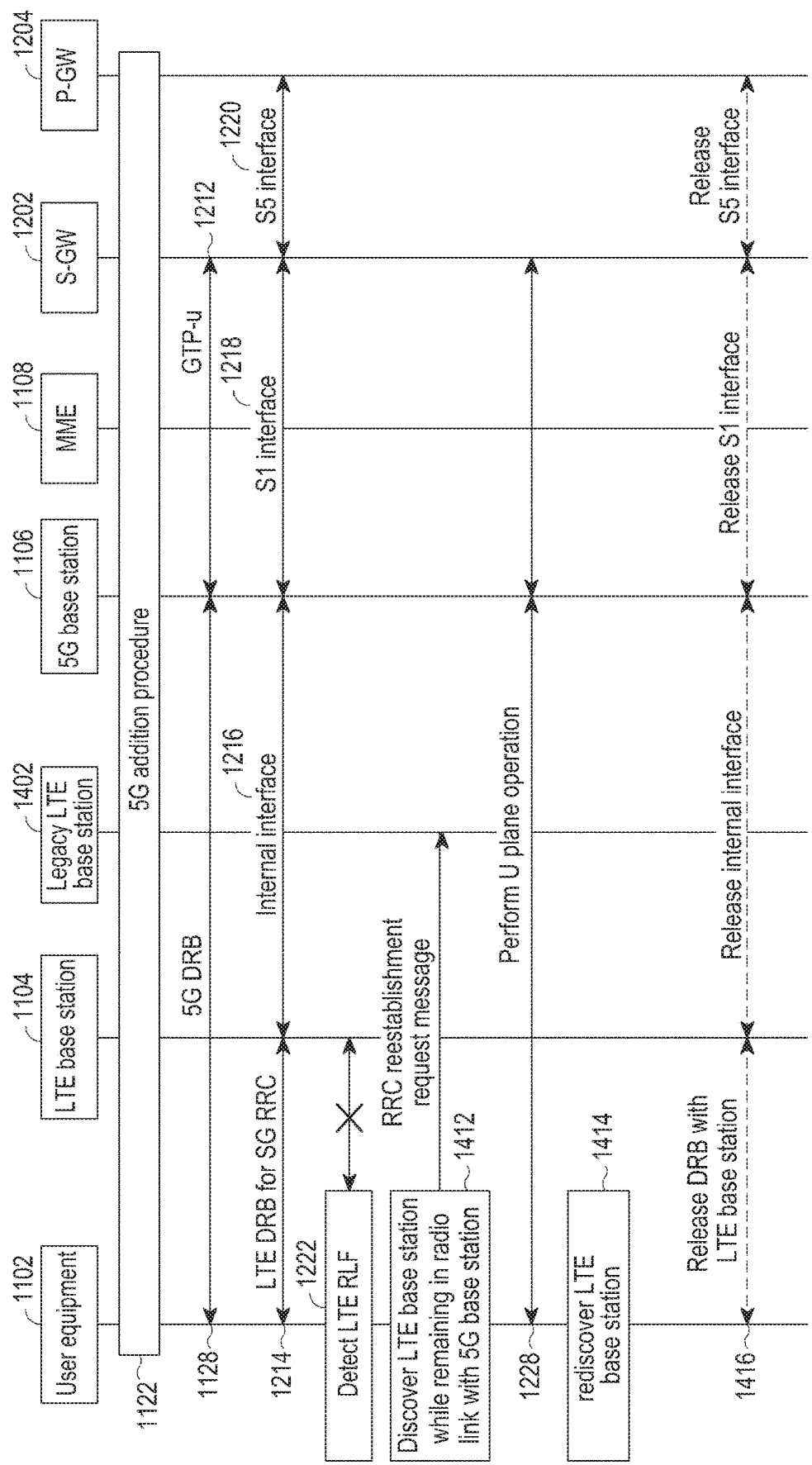
FIGS. 14A and 14B are flowcharts illustrating another processing method when an LTE RLF alone occurs according to an embodiment of the present disclosure.
Figure 14B:
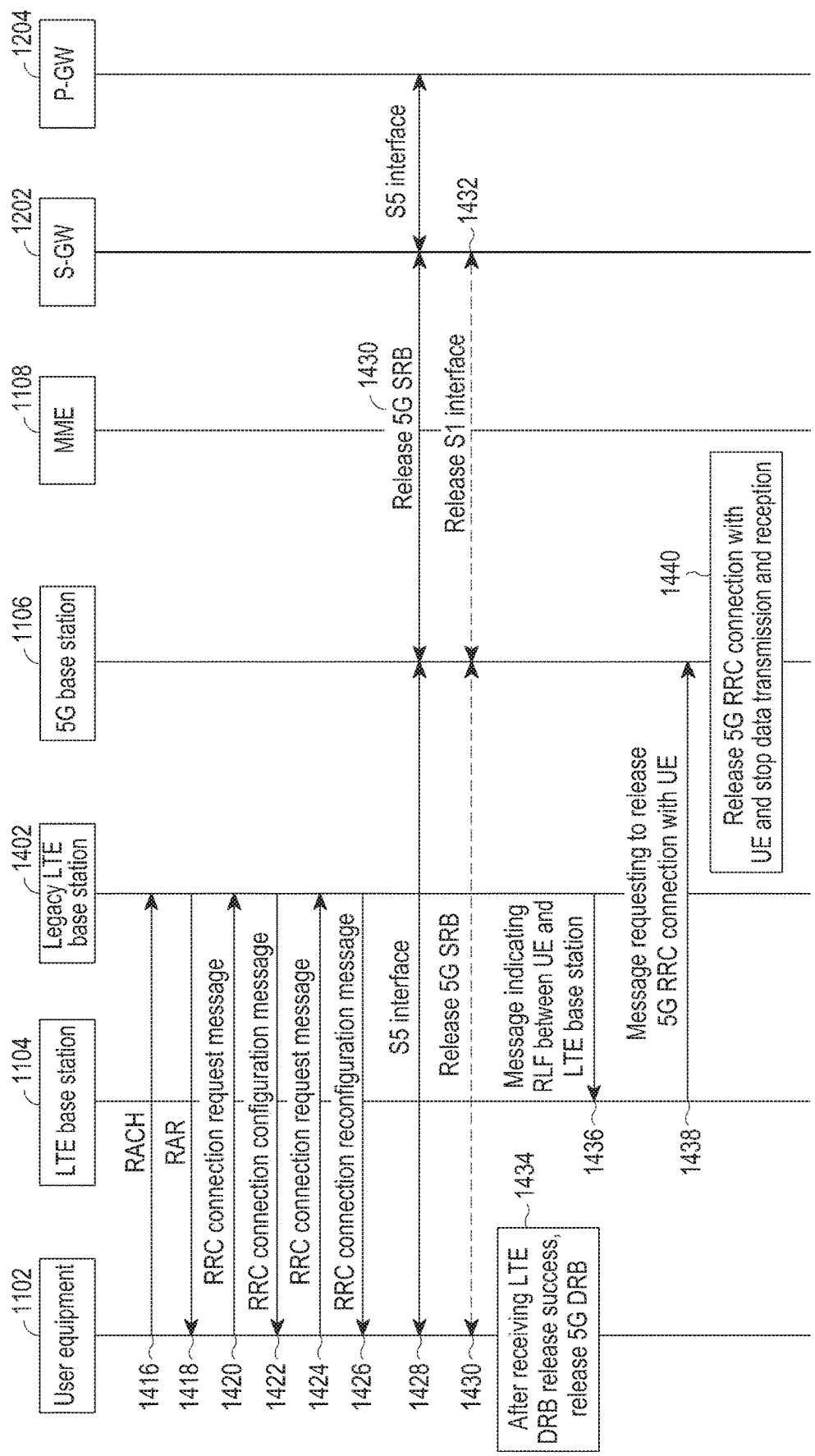

FIGS. 14A and 14B are flowcharts illustrating another processing method when an LTE RLF alone occurs according to an embodiment of the present disclosure.

Specifically, FIGS. 14A and 14B illustrate an example in which, although the radio link between the UE 1102 and the 5G base station 1106 is in a good state, the UE 1102 detects an RLF with the LTE base station 1104, and a base station discovered by the detection is a legacy LTE base station.

Referring to FIGS. 14A and 14B, the same configurations and operations as those in FIGS. 11, 12, 13A, and 13B are referenced by the same reference denotations and are omitted from a detailed description.

Referring to FIGS. 14A and 14B, the UE 1102 may detect an RLF with the LTE base station 1104 (i.e., an LTE RLF) at (1222). Even in this case, however, the UE 1102 does not release the radio link with the LTE base station 1104.

The UE 1102 discovers an LTE base station capable of a radio link at (1412). The LTE base station 1104 that used to be in radio link, an LTE base station that has not had a radio link, or a legacy LTE base station 1402 that had no radio link before may be discovered. The embodiment described with reference to FIGS. 14A and 14B is directed to the case where the legacy LTE base station 1402 with no radio link in the past is discovered.

When a legacy LTE base station 1402 is discovered, the UE 1102 sends an RRC connection reestablishment request message to the legacy LTE base station 1402 using information about the LTE base station that the UE 1102 owns. However, since the UE 1102 has not been linked with the legacy LTE base station 1402 before, and thus the legacy LTE base station 1402 does not bear the context for the UE 1102, the UE 1102 fails to reestablish the RRC connection with the legacy LTE base station 1402.

The UE 1102 discovers an LTE base station capable of a radio link, and the legacy LTE base station 1402 is discovered again at (1414). The UE 1102 switches into an RRC_idle state. That is, the UE 1102 releases the DRB with the LTE base station 1104, and the LTE base station 1104 releases the internal interface with the 5G base station 1106. Further, the 5G base station 1106 also releases the S1 interface for 5G RRC connection with the S-GW 1202. The state of the UE 1102 is described below in greater detail.

The UE 1102 performs a random access process with the legacy LTE base station 1402. That is, the UE 1102 transmits a RACH to the legacy LTE base station 1402 at (1416), and the legacy LTE base station 1402 transmits a RAR to the UE 1102 at (1418).

The UE 1102 transmits an RRC connection request message to the legacy LTE base station 1402 at (1420), and the legacy LTE base station 1402 transmits an RRC connection configuration message to the UE 1102 at (1422). When the RRC connection configuration is complete, the UE 1102 transmits an RRC connection configuration complete message to the legacy LTE base station 1402 at (1424).

Thereafter, the UE 1102 receives an RRC connection reconfiguration message from the legacy LTE base station 1402 at (1426).

The UE 1102 reestablishes the LTE DRB based on the received connection reconfiguration message at (1428). That is, the UE 1102 sends a request for LTE DRB configuration to the legacy LTE base station 1402, and the legacy LTE base station 1402 connects to the MME 1108 and the S-GW 1202 via the S1 interface. The S-GW 1202 connects to the P-GW 1204 via an S5 interface.

However, the UE 1102 may be aware that the legacy LTE base station 1402 is not an LTE base station supporting the 5G base station by identifying the public land mobile network ID (PLMN ID) of the legacy LTE base station 1402 during the course of reestablishing the LTE DRB.

The UE 1102 releases the reestablished LTE DRB at (1430). Further, the UE 1102 releases the S1 interface at (1432).

When receiving a message indicating that the release of the LTE DRB for 5G RRC connection succeeds from the legacy LTE base station 1402, the UE 1102 releases the 5G DRB with the 5G base station 1106 at (1434).

The legacy LTE base station 1402 transmits a message indicating the RLF between the LTE base station 1104 and the UE 1102 to the LTE base station 1104 using the X2 interface at (1436).

The LTE base station 1104 transmits a message requesting to release the 5G RRC connection with the UE 1102 to the 5G base station 1106 at (1438).

The 5G base station 1106 releases the 5G RRC connection and transmits no more data to the UE 1102 at (1440).

Figure 15A:
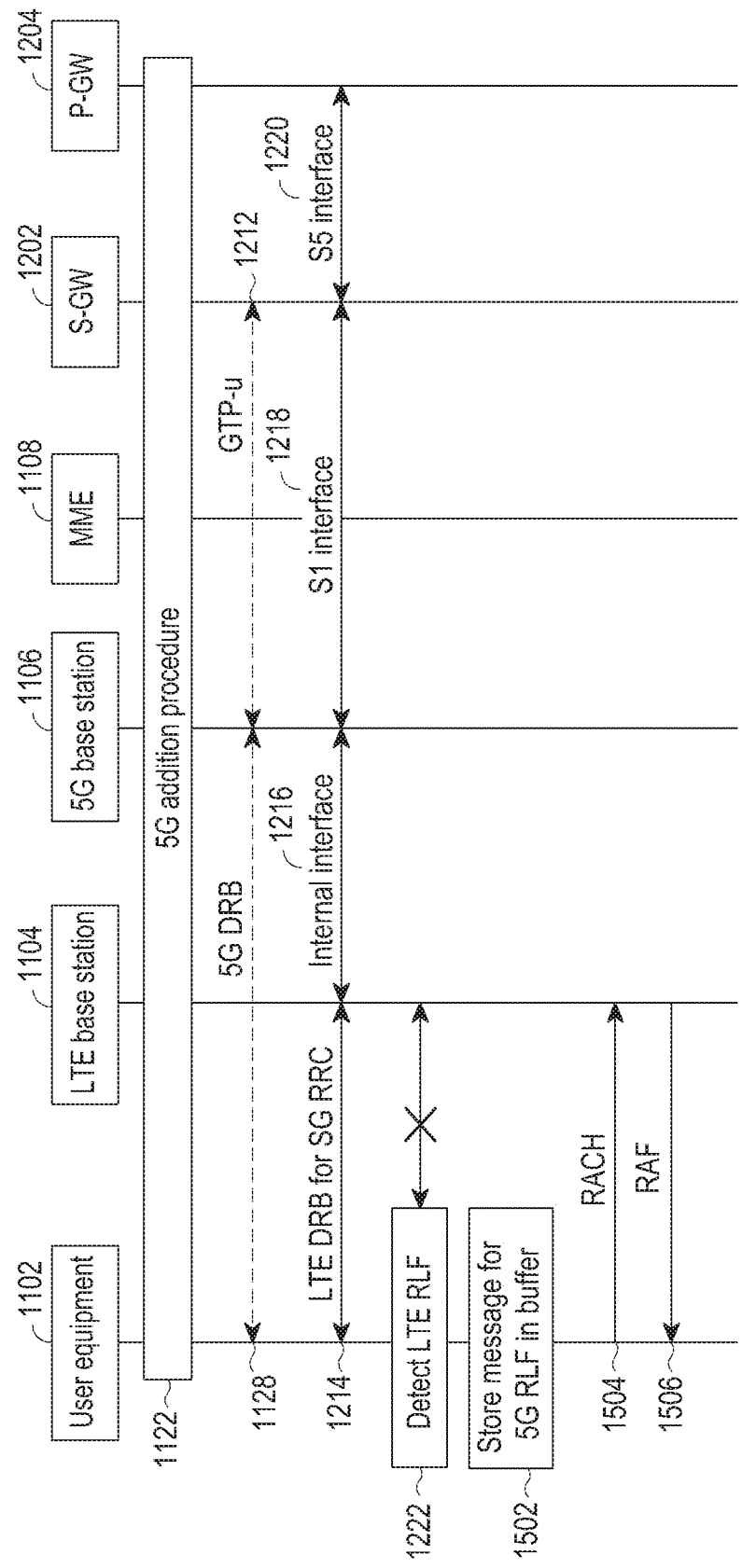

FIGS. 15A and 15B are flowcharts illustrating a processing method when a 5G RLF and an LTE RLF occur according to an embodiment of the present disclosure.

Specifically, FIGS. 15A and 15B illustrate an example in which the UE 1102 detects an RLF with the 5G base station 1106 and LTE base station 1104 and thus discovers another LTE base station, and the LTE base station 1104 has been discovered again.

Referring to FIGS. 15A and 15B, the same configurations and operations as those in FIGS. 11, 12, 13A, 13B, 14A, and 14B are referenced by the same reference denotations and are omitted from a detailed description.

Referring to FIGS. 15A and 15B, the UE 1102 may detect an RLF with the LTE base station 1104 (i.e., an LTE RLF) at (1222).

Thereafter, the UE 1102 may also detect an RLF with the 5G base station 1106. However, due to the LTE RLF, the UE 1102 cannot transmit a message for the 5G RLF through the LTE DRB to the LTE base station 1104 but stores in the buffer at (1502).

The UE 1102 discovers an LTE base station capable of a radio link. The LTE base station 1104 that used to be in radio link, a legacy LTE base station, or an LTE base station 1302 that had no radio link before may be discovered. The embodiment described with reference to FIGS. 15A and 15B is directed to the case where the LTE base station 1104 with no radio link in the past is discovered.

The UE 1102 performs a random access process with the LTE base station 1104. That is, the UE 1102 transmits a RACH to the LTE base station 1104 at (1504), and the LTE base station 1104 transmits a RAR to the UE 1102 at (1506).

The UE 1102 transmits an RRC reestablishment request message to the LTE base station 1104 at (1508), and the LTE base station 1104 transmits an RRC reestablishment message to the UE 1102 at (1510). The UE 1102 transmits an RRC connection reestablishment complete message to the LTE base station 1104 at (1512).

Thereafter, the LTE base station 1104 transmits an RRC connection reconfiguration message to the UE 1102 at (1514).

The UE 1102 establishes an LTE DRB for 5G RRC connection with the LTE base station 1104, i.e., the 5G SRB at (1516).

The UE 1102 transmits the message for 5G RLF stored in the buffer to the 5G base station 1106 at (1518). The UE 1102 may include information related to the 5G RLF stored in the buffer in a measurement report message and transmit the same to the 5G base station 1106.

The 5G base station 1106 transmits the RRC connection reconfiguration message or measurement configuration message to the UE 1102 at (1520).

The UE 1102 releases the 5G DRB and measures again a signal from the 5G base station 1106 at (1522).

The UE 1102 transmits a measurement report message for the measured signal through the LTE base station 1104 to the 5G base station 1106 at (1524).

When the measured signal is good, the UE 1102 performs a 5G addition procedure with the 5G base station 1106 at (1526).

Figure 16A:
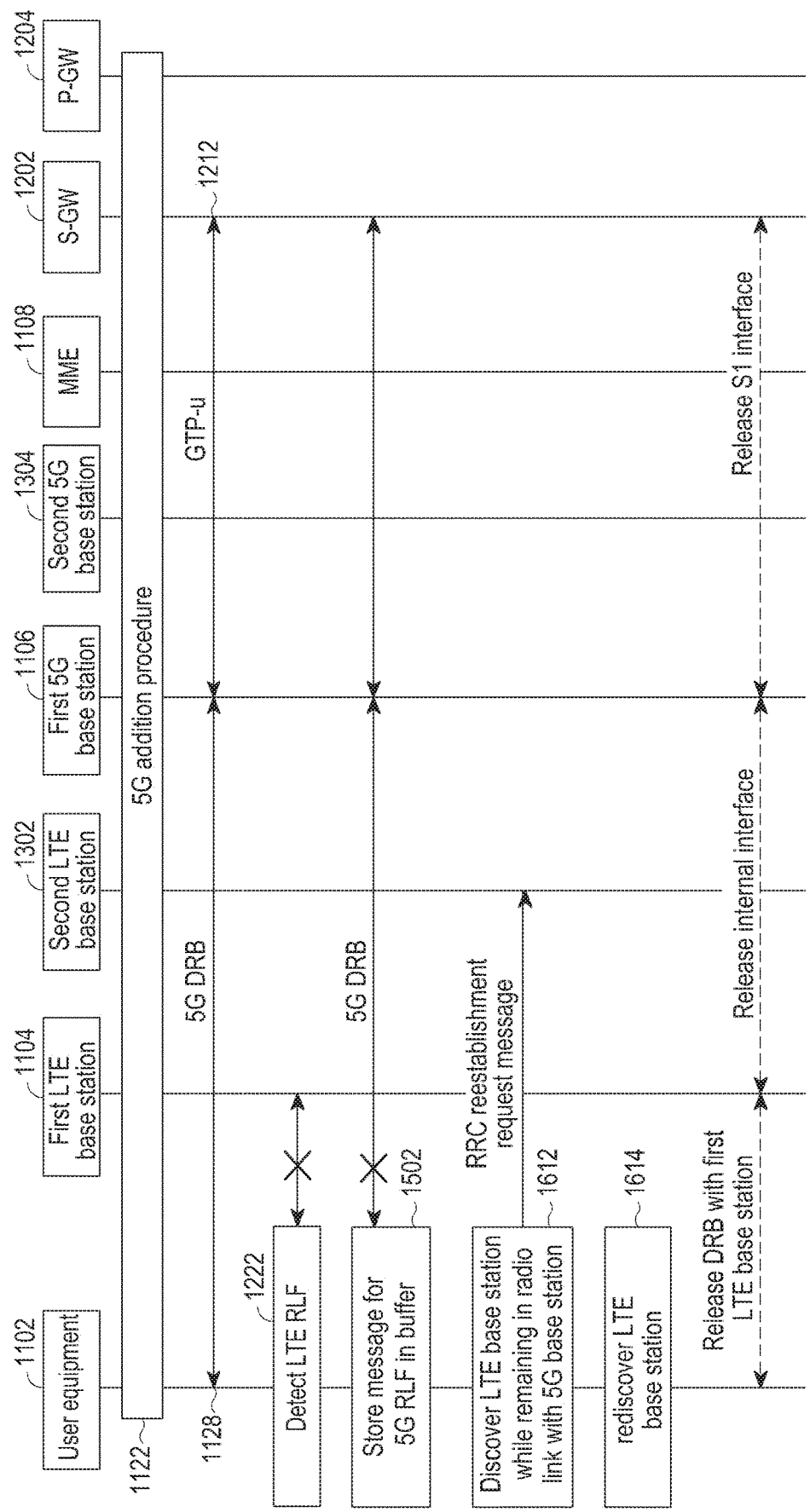
FIGS. 16A and 16B are flowcharts illustrating another processing method when a 5G RLF and an LTE RLF occur according to an embodiment of the present disclosure.
Figure 16B:
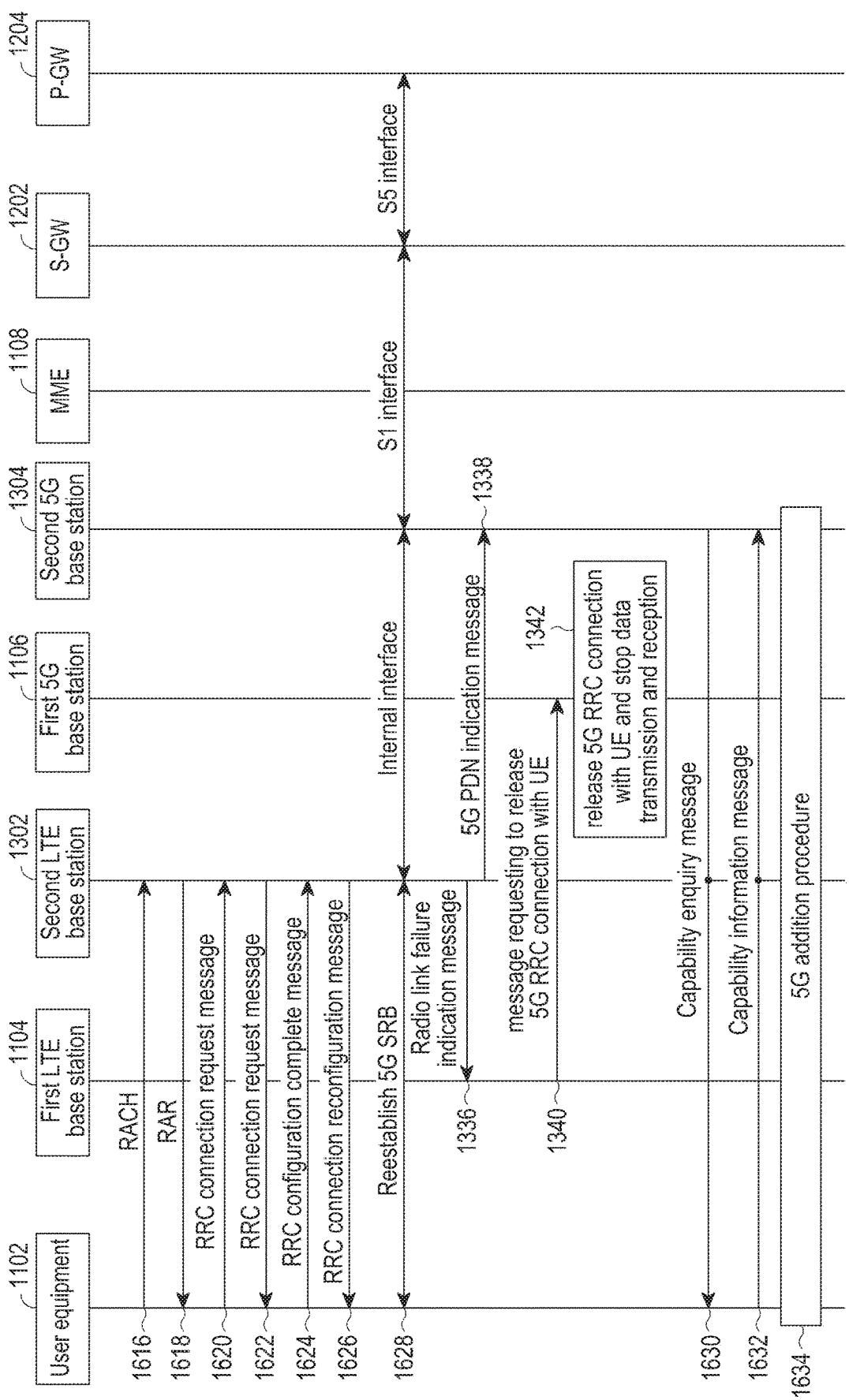

FIGS. 16A and 16B are flowcharts illustrating another processing method when a 5G RLF and an LTE RLF occur according to an embodiment of the present disclosure.

Specifically, FIGS. 16A and 16B illustrate an example in which after the UE 1102 detects an RLF with a first 5G station 1106 and an RLF with a first LTE base station 1104, another base station is discovered.

Referring to FIGS. 16A and 16B, the same configurations and operations as those in FIGS. 11, 12, 13A, 13B, 14A, 14B, 15A, and 15B are referenced by the same reference denotations and are omitted from a detailed description.

Referring to FIGS. 16A and 16B, the UE 1102 may detect an RLF with the first LTE base station 1104 (i.e., an LTE RLF) at (1222).

Thereafter, the UE 1102 may also detect an RLF with the first 5G base station 1106. However, due to the LTE RLF, the UE 1102 cannot transmit a message for the 5G RLF through the LTE DRB to the first LTE base station 1104, but stores the message in the buffer at (1502). Even in this case, however, the UE 1102 does not release the radio links with the first LTE base station 1104 and the first 5G base station 1106.

The UE 1102 discovers an LTE base station capable of a radio link at (1612). The first LTE base station 1104 that used to be in radio link, a legacy LTE base station, or a second LTE base station that had no radio link before may be discovered. The embodiment described with reference to FIGS. 16A and 16B is directed to the case where the second LTE base station 1302 with no radio link in the past is discovered.

When the second LTE base station 1302 is discovered, the UE 1102 sends an RRC connection reestablishment request message to the second LTE base station 1302 using information about the LTE base station that the UE 1102 owns. However, since the UE 1102 has not been linked with the second LTE base station 1302 before, and thus the second LTE base station 1302 does not bear the context for the UE 1102, the UE 1102 fails to reestablish the RRC connection with the second LTE base station 1302.

The UE 1102 discovers an LTE base station capable of a radio link, and the second LTE base station 1302 is discovered again at (1614). The UE 1102 switches into an RRC_idle state. That is, the UE 1102 releases the DRB with the first LTE base station 1104, and the first LTE base station 1104 releases the internal interface with the first 5G base station 1106. Further, the first 5G base station 1106 also releases the S1 interface for 5G RRC connection with the S-GW 1202. The state of the UE 1102 is described below in greater detail.

The UE 1102 performs a random access process with the second LTE base station 1302. That is, the UE 1102 transmits a RACH to the second LTE base station 1302 at (1616), and the second LTE base station 1302 transmits a RAR to the UE 1102 at (1618).

The UE 1102 transmits an RRC connection request message to the second LTE base station 1302 at (1620), and the second LTE base station 1302 transmits an RRC connection configuration message to the UE 1102 at (1622). When the RRC connection configuration is complete, the UE 1102 transmits a connection configuration complete message to the second LTE base station 1302 at (1624).

Thereafter, the UE 1102 receives an RRC connection reconfiguration message from the second LTE base station 1302 at (1626).

The UE 1102 reestablishes an LTE DRB, i.e., 5G SRB, based on the received RRC connection reconfiguration message at (1628). That is, the UE 1102 sends a request for LTE DRB configuration to the second LTE base station 1302, and the second LTE base station 1302 connects to the MME 1108 and the S-GW 1202 via the S1 interface. The S-GW 1202 connects to the P-GW 1204 via an S5 interface.

Since the second 5G base station 1304 is aware that the UE 1102 is one that has connected with the 5G base station before, the second 5G base station 1304 transmits a capability enquiry message to the UE 1102 through the second LTE base station 1302, i.e., using the LTE DRB for 5G RRC connection at (1630). The capability enquiry message may contain information (e.g., an ID) about the second LTE base station 1302 and/or the second 5G base station 1304.

The UE 1102 transmits a capability information message to the second 5G base station 1304 at (1632).

Thus, the UE 1102 performs a 5G addition procedure with the second 5G base station 1304 at (1634).

Figure 17A:
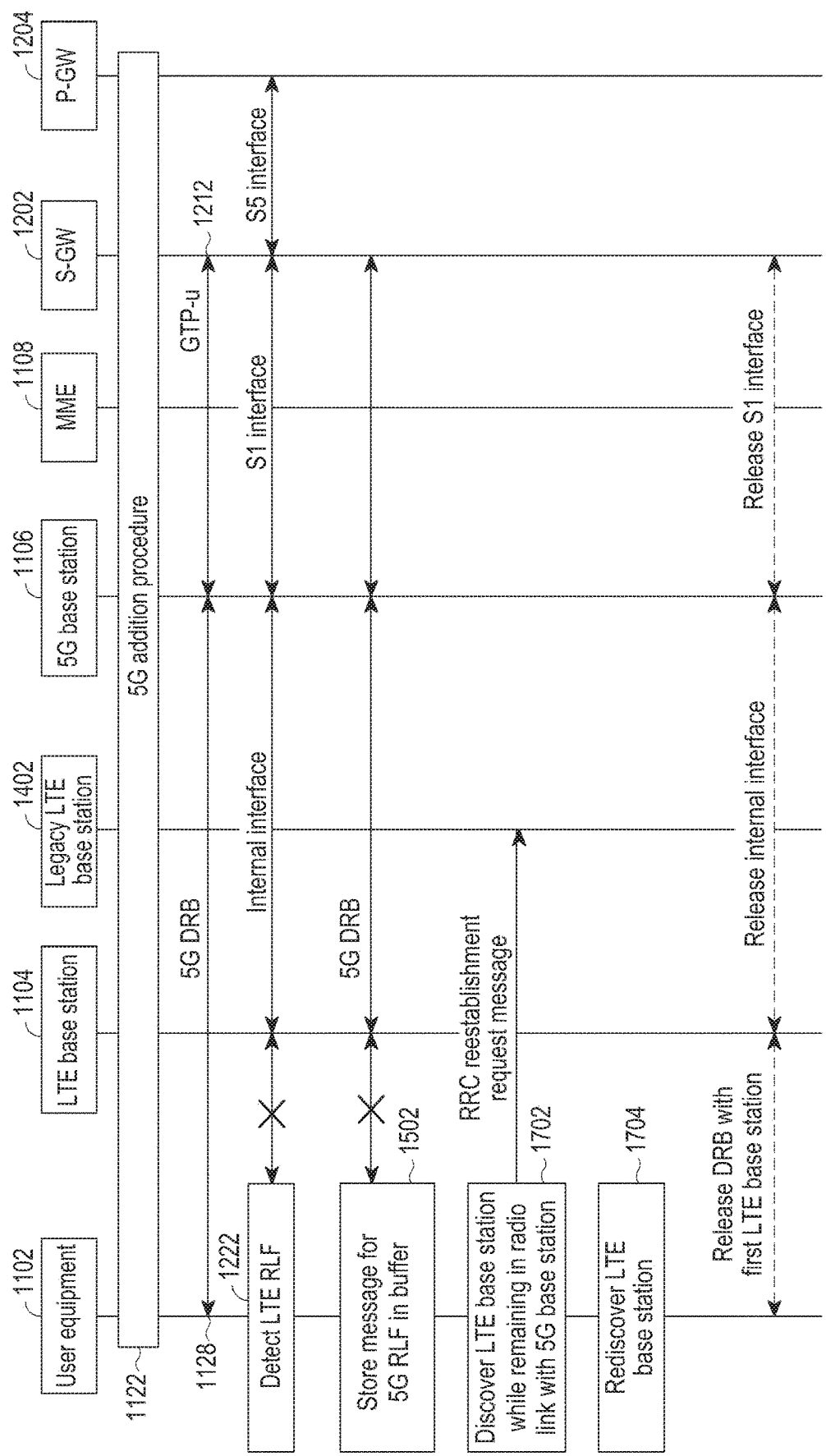
FIGS. 17A and 17B are flowcharts illustrating another processing method when a 5G RLF and an LTE RLF occur according to an embodiment of the present disclosure.
Figure 17B:
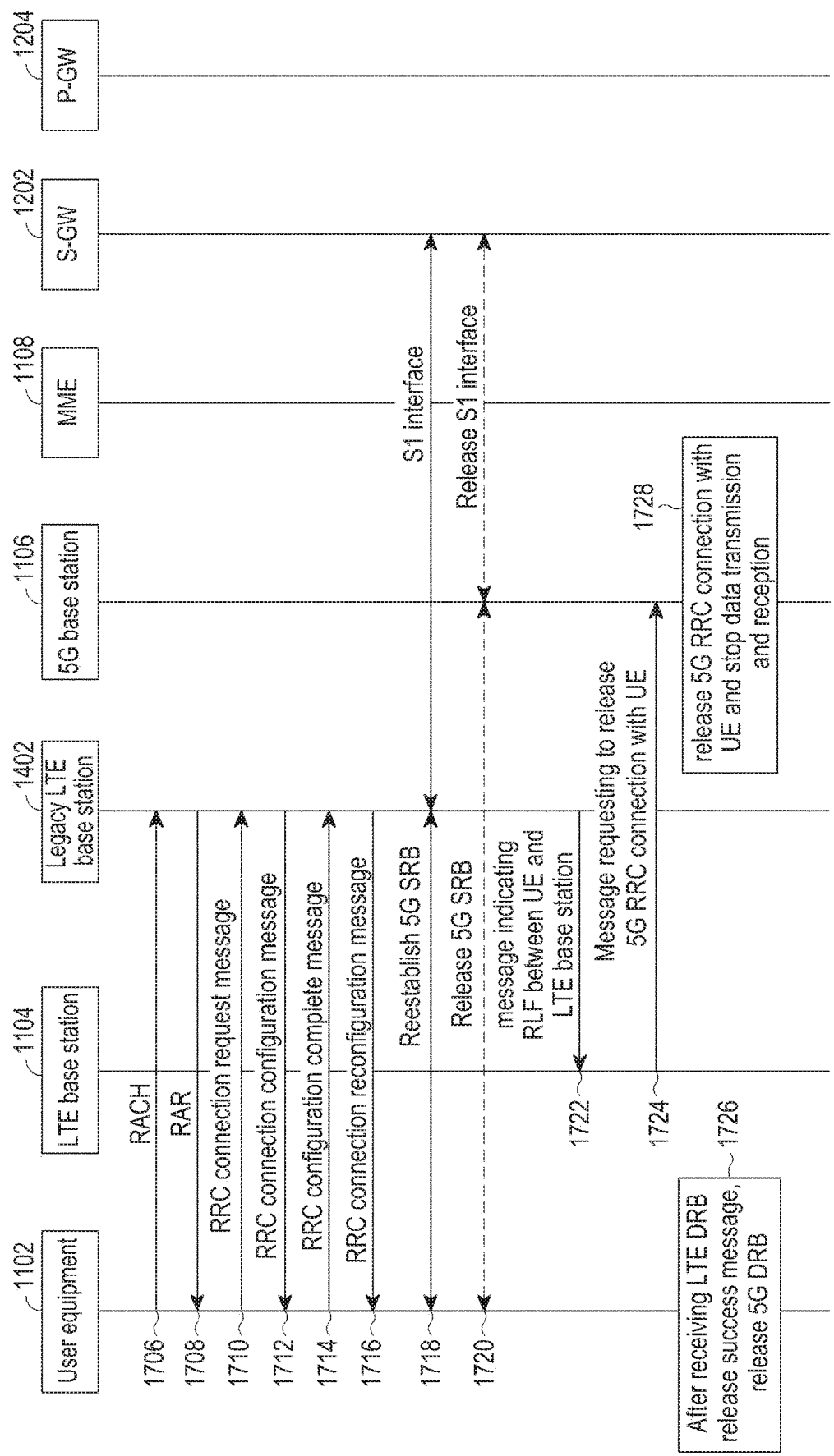

FIGS. 17A and 17B are flowcharts illustrating another processing method when a 5G RLF and an LTE RLF occur according to an embodiment of the present disclosure.

Specifically, FIGS. 17A and 17B illustrate an example in which after the UE 1102 detects RLFs with the 5G base station 1106 and the LTE base station 1104, a legacy LTE base station is discovered.

Referring to FIGS. 17A and 17B, the same configurations and operations as those in FIGS. 11, 12, 13A, 13B, 14A, 14B, 15A, 15B, 16A, and 16B are referenced by the same reference denotations and are omitted from a detailed description.

Referring to FIGS. 17A and 17B, the UE 1102 may detect an RLF with the LTE base station 1104 (i.e., an LTE RLF) at (1222).

Thereafter, the UE 1102 may also detect an RLF with the 5G base station 1106. However, due to the LTE RLF, the UE 1102 cannot transmit a message for the 5G RLF through the LTE DRB to the LTE base station 1104 but stores in the buffer at (1502).

The UE 1102 discovers an LTE base station capable of a radio link at (1702). The LTE base station 1104 that used to be in radio link, a legacy LTE base station, or an LTE base station 1302 that had no radio link before may be discovered. The embodiment described with reference to FIGS. 17A and 17B is directed to the case where the legacy LTE base station 1402 that has not had a radio link is discovered.

When the legacy LTE base station 1402 is discovered, the UE 1102 sends an RRC connection reestablishment request message to the legacy LTE base station 1402 using information about the LTE base station that the UE 1102 owns. However, since the UE 1102 has not been linked with the legacy LTE base station 1402 before, and thus the legacy LTE base station 1402 does not bear the context for the UE 1102, the UE 1102 fails to reestablish the RRC connection with the legacy LTE base station 1402.

The UE 1102 discovers an LTE base station capable of a radio link, and the legacy LTE base station 1302 is discovered again. The UE 1102 switches into an RRC_idle state at (1704). That is, the UE 1102 releases the DRB with the LTE base station 1104, and the LTE base station 1104 releases the internal interface with the 5G base station 1106. Further, the 5G base station 1106 also releases the S1 interface for 5G RRC connection with the S-GW 1202. The state of the UE 1102 is described below in greater detail.

The UE 1102 performs a random access process with the legacy LTE base station 1402. That is, the UE 1102 transmits a RACH to the legacy LTE base station 1402 at (1706), and the legacy LTE base station 1302 transmits a RAR to the UE 1102 at (1708).

The UE 1102 transmits an RRC connection request message to the legacy LTE base station 1402 at (1710), and the legacy LTE base station 1402 transmits an RRC connection configuration message to the UE 1102 at (1712). When the RRC connection configuration is complete, the UE 1102 transmits a connection configuration complete message to the legacy LTE base station 1302 at (1714).

Thereafter, the UE 1102 receives an RRC connection reconfiguration message from the legacy LTE base station 1302 at (1716).

The UE 1102 reestablishes the LTE DRB based on the received connection reconfiguration message at (1718). That is, the UE 1102 sends a request for LTE DRB configuration to the legacy LTE base station 1402, and the legacy LTE base station 1402 connects to the MME 1108 and the S-GW 1202 via the S1 interface. The S-GW 1202 connects to the P-GW 1204 via an S5 interface.

However, the UE 1102 may be aware that the legacy LTE base station 1402 is not an LTE base station supporting the 5G base station by identifying the PLMN ID of the legacy LTE base station 1402 during the course of reestablishing the LTE DRB.

The UE 1102 releases the reestablished LTE DRB at (1720).

The legacy LTE base station 1402 reports the RLF between the LTE base station 1104 and the UE 1102 to the LTE base station 1104 using the X2 interface at (1722).

The LTE base station 1104 requests the 5G base station 1106 to release the 5G RRC connection with the UE 1102 at (1724).

When receiving a message indicating that the release of the LTE DRB for 5G RRC connection succeeds from the legacy LTE base station 1402, the UE 1102 releases the 5G DRB with the 5G base station 1106 at (1726).

The 5G base station 1106 releases the 5G RRC connection and transmits no more data to the UE 1102 at (1728).

Hereinafter, state diagrams of the UE considering the LTE RLF are described. FIG. 10 described above is a state diagram of the UE considering only the 5G RLF.

Figure 18:
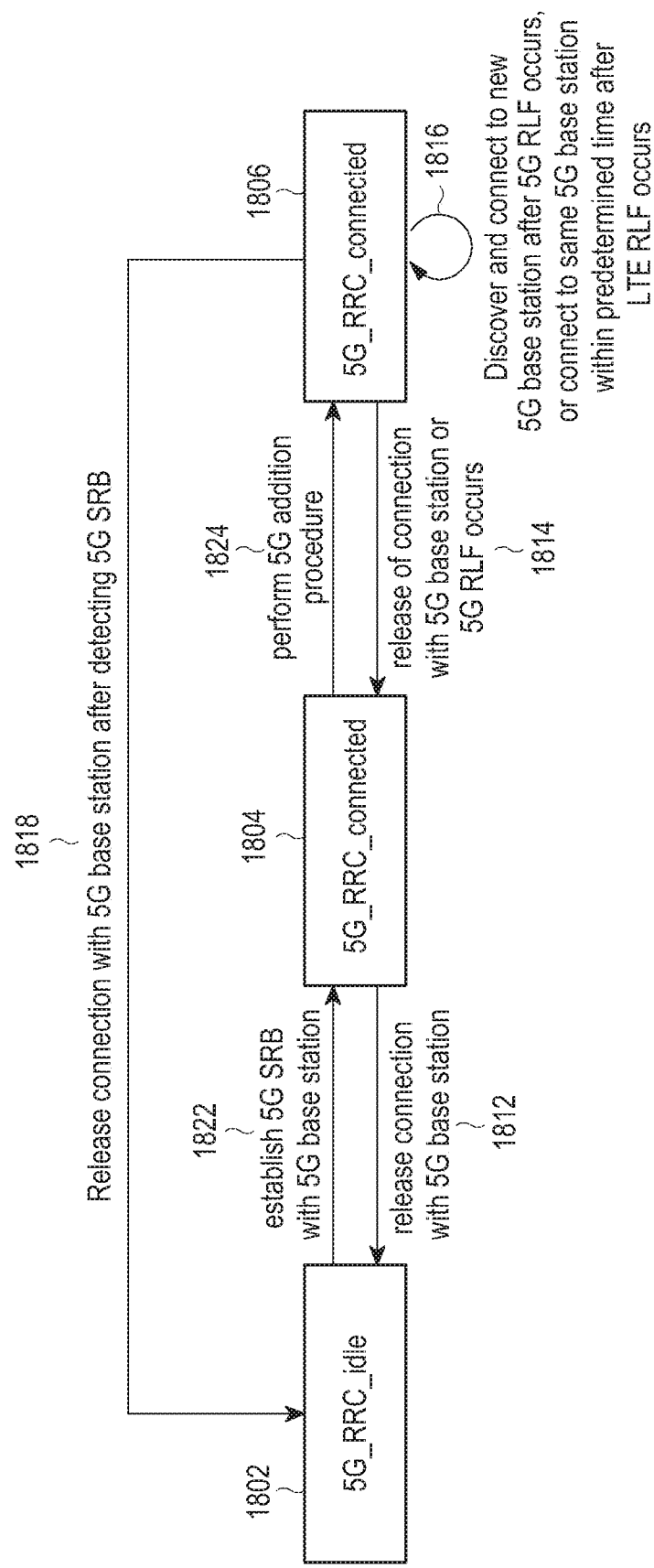
FIG. 18 is a state diagram illustrating a UE according to an embodiment of the present disclosure.

FIG. 18 is a state diagram illustrating a UE according to an embodiment of the present disclosure.

Referring to FIG. 18, the UE may come in three states depending on the state of the radio link with the 5G RRC unit and 5G base station.

The first state is a 5G_RRC_idle state 1802, the second state is a 5G_RRC_connected state 1804, and the third state is a 5G_base station_connected state 1806.

The 5G_RRC_idle state 1802 is a state free of 5G SRB, i.e., LTE DRB for 5G RRC. That is, in this state, no connection is established with the 5G base station. Selectively, the UE may delete the context generated before in the 5G_RRC_connected state or 5G_base station_connected state. Further, the 5G base station may also delete the context for the UE. When the UE establishes a 5G SRB with the 5G base station in this state, the UE turns into the 5G_RRC_connected state 1804 at (1822). On the contrary, when the connection with the 5G base station is released in the 5G_RRC_connected state 1804, the UE switches into the 5G_RRC_idle state 1802 at (1812).

The 5G_RRC_connected state 1804 is a state in which the UE performs a 5G addition procedure with the 5G base station so that a 5G SRB is established. In this state, the UE measures a state from a nearby base station and performs measurement reporting according to a result. Further, the UE receives system information from each base station. When the UE performs a 5G addition procedure with the 5G base station in this state, the UE turns into the 5G_base station_connected state 1806 at (1824). In contrast, when the connection with the 5G base station is released or a 5G RLF occurs, the UE switches from the 5G_base station_connected state 1806 to the 5G_RRC_connected state 1804 at (1814).

The 5G_base station_connected state 1806 is a state in which the 5G SRB is established, and the UE transmit and receive data to/from the 5G base station in a unicast manner. In this state, a lower layer of the UE may set a connected DRX mode unique to the UE. Further, when the UE supports carrier aggregation, the UE may expand the bandwidth and operate with the primary cell (Pcell) using one or more secondary cells (Scells). The UE may monitor the control channel and figure out whether its data has been scheduled in the shared data channel associated with the control channel. The UE may measure the channel state and feedback a result, and the UE may perform beam measurement. Further, the UE measures a nearby base station or serving base station, reports a result, and receives system information from the base station. When a 5G RLF occurs so that a new 5G base station is discovered and connected or when the same 5G base station is connected within a particular time after an LTE RLF has occurred, the UE remains in the 5G_base station_connected state 1806 rather than turning into the 5G_RRC_idle state 1802 at (1816).

However, when the UE releases the connection with the 5G base station after detecting the 5G SRB, the UE turns into the 5G_RRC_idle state 1802 at (1818). Specifically, the following scenarios may fall within the case: when an LTE RLF occurs and then the UE fails to reestablish with the LTE base station so that the UE turns into the LTE idle mode; when, after an LTE RLF occurs, the UE establishes with another LTE base station so that it should connect with a new base station; or when, after an LTE RLF occurs, no recovery is performed or recovery is retarded so that the connection with the LTE base station should be released.

Figure 19:
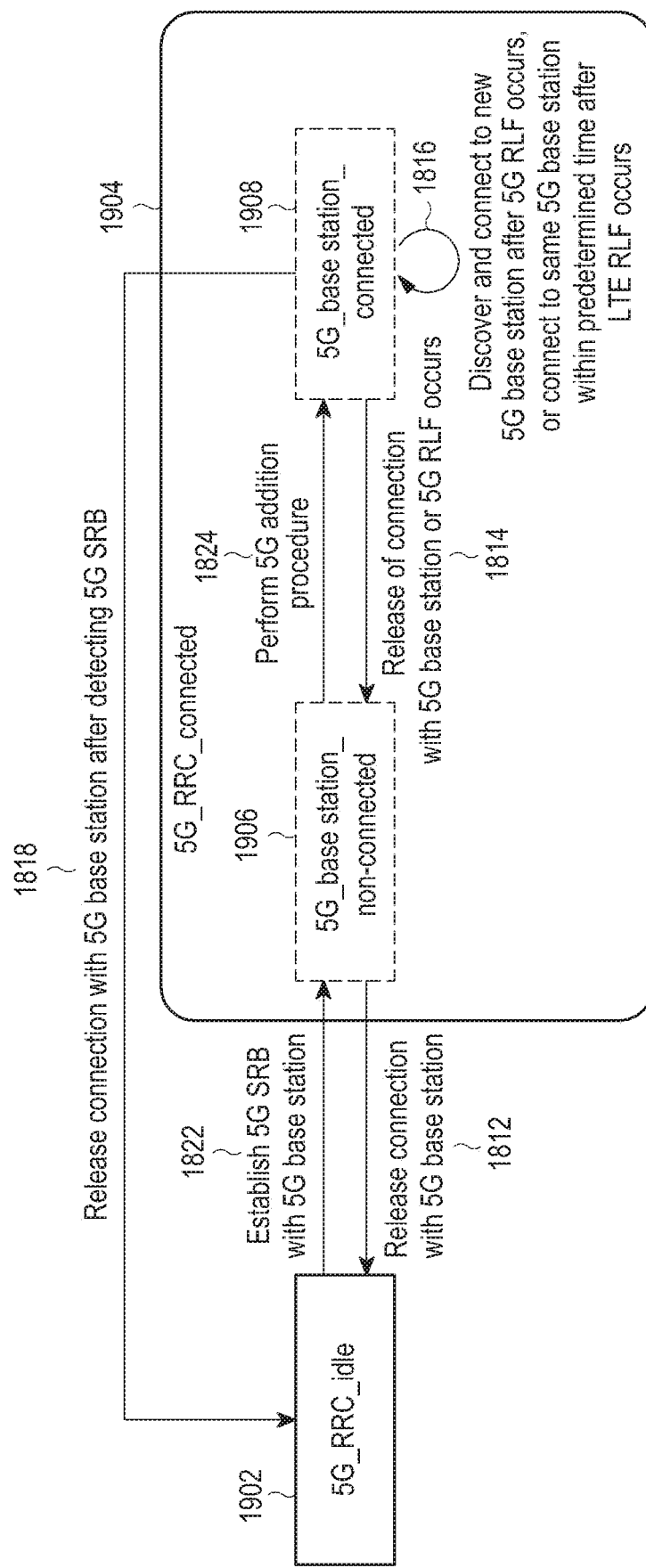
FIG. 19 is a state diagram illustrating a UE according to an embodiment of the present disclosure.

FIG. 19 is a state diagram illustrating a UE according to an embodiment of the present disclosure.

Referring to FIG. 19, the UE may come in two states depending on the state of the radio link with the 5G RRC unit.

The first state is a 5G_RRC_idle state 1902, and the second state is a 5G_RRC_connected state 1904. However, the UE may internally divide the 5G_RRC_connected state 1904 into a 5G base station_non-connected state 1906 and a 5G_base station_connected state 1908 and manage them.

The state diagram of FIG. 19 is similar to the state diagram of FIG. 18. Thus, the 5G_RRC_idle state 1902 of FIG. 19 may correspond to the 5G_RRC_idle state 1802 of FIG. 18, the 5G_base station_non-connected state 1906 of FIG. 19 may correspond to the 5G_RRC_connected state 1804 of FIG. 18, and the 5G_base station_connected state 1908 of FIG. 19 may correspond to the 5G_base station_connected state 1806 of FIG. 18. Further, the same transitioning conditions between the operations apply, and thus, are denoted with the same reference denotations, no further description of which is given below.

Figure 20:
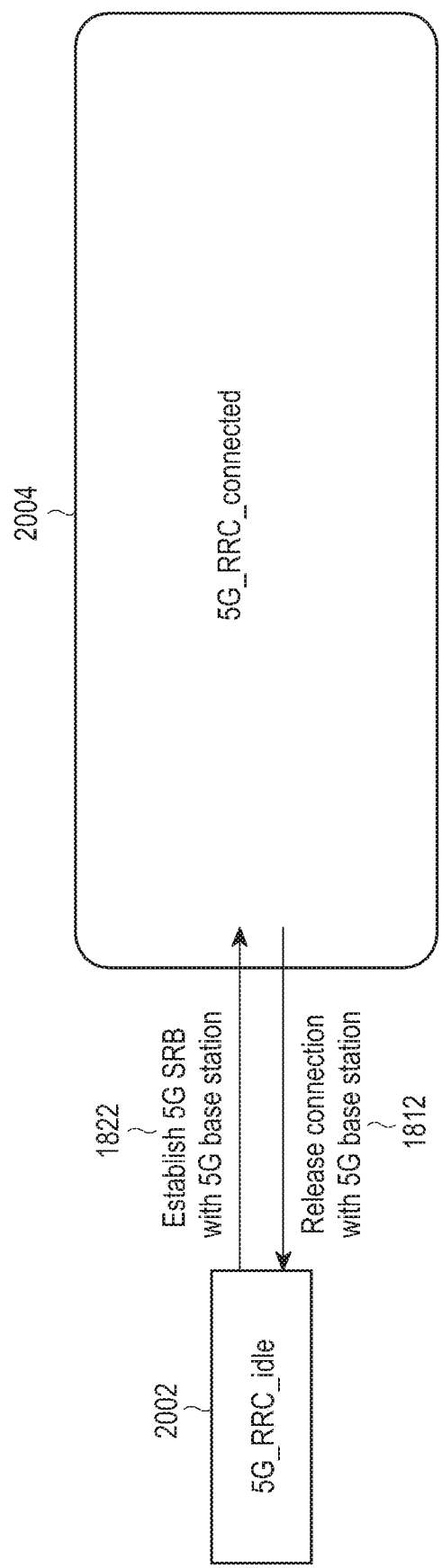
FIG. 20 is a state diagram illustrating a UE according to an embodiment of the present disclosure.

FIG. 20 is a state diagram illustrating a UE according to an embodiment of the present disclosure.

Referring to FIG. 20, unlike in FIG. 19, a 5G_RRC_connected state 2004 is not divided and managed distinctly from the 5G_base station_non-connected state 1906 and the 5G_base station_connected state 1908. Thus, a 5G_RRC_idle state 2002 and the 5G_RRC_connected state 2004 may come in categories.

The operations performed in the 5G_base station_non-connected state 1906 and the 5G_base station_connected state 1908 of FIG. 19 are all performed in the 5G_RRC_connected state 2004 of FIG. 20. Further, the transition between the 5G_RRC_idle state 2002 and the 5G_RRC_connected state 2004 of FIG. 20 may correspond to the transition between the 5G_RRC_idle state 1902 and the 5G_base station_non-connected state 1906 of FIG. 19, and thus, no further description is presented here.

Figure 21:
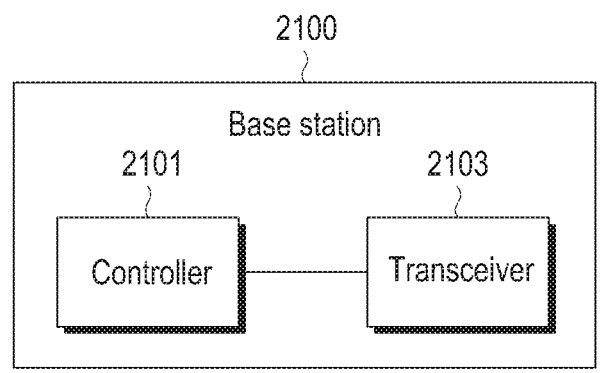
FIG. 21 is a block diagram illustrating a configuration of a base station according to an embodiment of the present disclosure.

FIG. 21 is a block diagram illustrating a configuration of a base station according to an embodiment of the present disclosure. For ease of description, components not directly related to the present disclosure are neither shown nor described.

Referring to FIG. 21, a base station 2100 may include a processor or controller 2101 and a transceiver 2103. Although an example is described here that operations are performed with the controller 2101 and the transceiver 2103 separated from each other, all of the operations may also be performed in a single component as necessary. The components may be divided into more components.

The transceiver 2103 may transmit and receive control signals and data to/from the UE and may transmit and receive messages to/from the MME or other base stations.

The controller 2101 may not only control the operation of the transceiver 2103 but also perform the above-described operations.

The base station 2100 may correspond to each of the LTE base station, 5G base station, and the legacy base station.

Figure 22:
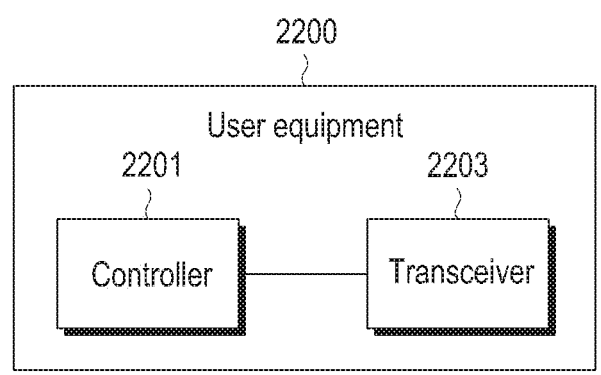
FIG. 22 is a block diagram illustrating a configuration of a UE according to an embodiment of the present disclosure.

FIG. 22 is a block diagram illustrating a configuration of a UE according to an embodiment of the present disclosure. For ease of description, components not directly related to the present disclosure are neither shown nor described.

Referring to FIG. 22, a UE 2200 may include a processor or controller 2201 and a transceiver 2203. Although an example is described here that operations are performed with the controller 2201 and the transceiver 2203 separated from each other, all of the operations may also be performed in a single component as necessary. The components may be divided into more components.

The transceiver 2203 may transmit and receive control signals and data to/from at least one base station.

The controller 2201 may not only control the operation of the transceiver 2203 but also perform the above-described operations of the UE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating by a user equipment (UE) supporting a dual-connectivity communication system, the method comprising:
    detecting that a radio link with a first base station fails; and
    in case that the radio link with the first base station fails:
        suspending data transmission with the first base station, and
        transmitting, to a second base station, information indicating that the radio link with the first base station fails,
    wherein the information includes an identifier of a reference signal from the first base station, a measurement result of the reference signal from the first base station, an identifier of a reference signal from a neighbor base station, and a measurement result of the reference signal from the neighbor base station, and
    wherein the information indicating that the radio link with the first base station failed is associated with a determination of release of the radio link with the UE by the first base station.

2. The method of claim 1, wherein the detecting that the radio link with the first base station fails comprises detecting, by the UE, that the radio link with the first base station fails based on the measurement result of the reference signal from the first base station.

3. The method of claim 1, wherein the first base station configures a secondary cell (SCell) and the second base station configures a primary cell (PCell).

4. The method of claim 1, wherein the first base station is a 5G base station and the second base station is a long term evolution (LTE) base station.

5. The method of claim 1, wherein the data transmission is suspended for all signal radio bearers (SRBs) and data radio bearers (DRBs).

6. A method for communicating by a first base station in a dual-connectivity communication system, the method comprising:
    transmitting, to a user equipment (UE), a reference signal; and
    in case that a radio link between the UE and the first base station fails:
        receiving, from a second base station, information indicating that the radio link between the UE and the first base station fails,
        suspending data transmission with the UE, and
        determining whether to release the radio link with the UE based on the information indicating that the radio link between the UE and the first base station fails,
    wherein the information includes an identifier of a reference signal transmitted from the first base station, a measurement result of the reference signal transmitted from the first base station, an identifier of a reference signal transmitted from a neighbor base station, and a measurement result of the reference signal transmitted from the neighbor base station.

7. The method of claim 6, wherein the UE detects that the radio link between the UE and the first base station fails based on the measurement result of the reference signal transmitted from the first base station.

8. The method of claim 6, wherein the first base station configures a secondary cell (SCell) and the second base station configures a primary cell (PCell).

9. The method of claim 6, wherein the first base station is a 5G base station and the second base station is a long term evolution (LTE) base station.

10. The method of claim 6, wherein the data transmission is suspended for all signal radio bearers (SRBs) and data radio bearers (DRBs).

11. A user equipment (UE) supporting a dual-connectivity communication system, the UE comprising:
a transceiver configured to transmit and receive data; and
at least one processor configured to:
detect that a radio link with a first base station fails, and
in case that the radio link with the first base station fails;
suspend data transmission with the first base station, and
control to transmit, to a second base station, information indicating that the radio link with the first base station fails,
wherein the information includes an identifier of a reference signal from the first base station, a measurement result of the reference signal from the first base station, an identifier of a reference signal from a neighbor base station, and a measurement result of the reference signal from the neighbor base station, and
wherein the information indicating that the radio link with the first base station failed is associated with a determination of release of the radio link with the UE by the first base station.

12. The UE of claim 11, wherein, to detect that the radio link with the first base station fails, the at least one processor is configured to detect that the radio link with the first base station fails based on the measurement result of the reference signal from the first base station.

13. The UE of claim 11, wherein the first base station configures a secondary cell (SCell) and the second base station configures a primary cell (PCell).

14. The UE of claim 11, wherein the first base station is a 5G base station and the second base station is a long term evolution (LTE) base station.

15. The UE of claim 11, wherein the data transmission is suspended for all signal radio bearers (SRBs) and data radio bearers (DRBs).

16. A first base station in a dual-connectivity communication system, the first base station comprising:
a transceiver configured to transmit and receive data; and
at least one processor configured to:
control to transmit, to a user equipment (UE), a reference signal,
in case that a radio link between the UE and the first base station fails:
control to receive, from a second base station, information indicating that the radio link between the UE and the first base station fails,
suspend data transmission with the UE, and
determine whether to release the radio link with the UE based on the information indicating that the radio link between the UE and the first base station fails,
wherein the information includes an identifier of a reference signal transmitted from the first base station, a measurement result of the reference signal transmitted from the first base station, an identifier of a reference signal transmitted from a neighbor base station, and a measurement result of the reference signal transmitted from the neighbor base station.

17. The first base station of claim 16, wherein the UE detects that the radio link between the UE and the first base station fails based on the measurement result of the reference signal transmitted from the first base station.

18. The first base station of claim 16, wherein the first base station configures a secondary cell (SCell) and the second base station configures a primary cell (PCell).

19. The first base station of claim 16, wherein the first base station is a 5G base station and the second base station is a long term evolution (LTE) base station.

20. The first base station of claim 16, wherein the data transmission is suspended for all signal radio bearers (SRBs) and data radio bearers (DRBs).

21. The method of claim 1, wherein the second base station determines whether radio link failure between the UE and the first base station is continuous or temporary based on the information indicating that the radio link with the first base station fails.

22. The method of claim 6, further comprising:
in response to receiving the information indicating that the radio link between the UE and the first base station fails, activating a timer,
wherein the suspending of the data transmission with the UE is performed based on the timer.

* * * * *